US011902963B2

(12) United States Patent
Sosnin et al.

(10) Patent No.: US 11,902,963 B2
(45) Date of Patent: Feb. 13, 2024

(54) COVERAGE ENHANCEMENT FOR PHYSICAL UPLINK CONTROL CHANNEL TRANSMISSIONS IN NEW RADIO

(71) Applicant: Intel Corporation, Santa Clara, CA (US)

(72) Inventors: Sergey Sosnin, Zavolzhie (RU); Gang Xiong, Portland, OR (US); Avik Sengupta, San Jose, CA (US); Alexei Davydov, Nizhny Novgorod (RU); Jie Zhu, San Jose, CA (US); Gregory Ermolaev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 17/233,143

(22) Filed: Apr. 16, 2021

(65) Prior Publication Data

US 2021/0298048 A1  Sep. 23, 2021

Related U.S. Application Data

(60) Provisional application No. 63/011,909, filed on Apr. 17, 2020, provisional application No. 63/015,364, (Continued)

(51) Int. Cl.
| | | |
|---|---|---|
| *H04W 72/12* | (2023.01) | |
| *H04W 72/1268* | (2023.01) | |
| *H04W 72/044* | (2023.01) | |
| *H04L 27/26* | (2006.01) | |
| *H04W 72/0453* | (2023.01) | |
| *H04L 1/00* | (2006.01) | |
| *H04W 72/0446* | (2023.01) | |

(52) U.S. Cl.
CPC ....... *H04W 72/1268* (2013.01); *H04L 1/0071* (2013.01); *H04L 27/2607* (2013.01); *H04W 72/0446* (2013.01); *H04W 72/0453* (2013.01); *H04W 72/0466* (2013.01)

(58) Field of Classification Search
CPC .............. H04L 1/0071; H04L 27/2607; H04L 27/2614; H04L 5/0053; H04L 5/0057; H04W 72/0446; H04W 72/0453; H04W 72/046; H04W 72/0466; H04W 72/1268; H04W 72/21
See application file for complete search history.

(56) References Cited

U.S. PATENT DOCUMENTS

2013/0176982 A1* 7/2013 Han .................... H04W 72/21
370/329
2021/0211343 A1* 7/2021 Baldemair ........ H04W 72/1263

OTHER PUBLICATIONS

3GPP, "Technical Specification Group Radio Access Network; NR; Physical channels and modulation (Release 16)," 3GPP TS 38.211 V16.1.0 (Mar. 2020), 5G, 130 pages.
(Continued)

*Primary Examiner* — Mansour Oveissi
(74) *Attorney, Agent, or Firm* — Schwabe, Williamson & Wyatt, P.C.

(57) ABSTRACT

Among other things, some embodiments of the present disclosure are directed to coverage enhancement techniques for the physical uplink control channel (PUCCH). Specifically, the PUCCH may be transmitted from two or more antenna ports of a user equipment (UE) based on configuration information received from a base station. Other embodiments may be disclosed and/or claimed.

19 Claims, 10 Drawing Sheets

Related U.S. Application Data filed on Apr. 24, 2020, provisional application No. 63/052,152, filed on Jul. 15, 2020.

(56) References Cited

OTHER PUBLICATIONS

3GPP, "Technical Specification Group Radio Access Network; NR; Physical layer procedures for control (Release 16)," 3GPP TS 38.213 V16.1.0 (Mar. 2020), 5G, 156 pages.
3GPP, "Technical Specification Group Radio Access Network; NR; Radio Resource Control (RRC) protocol specification (Release 16)," 3GPP TS 38.331 V16.0.0 (Mar. 2020), 5G, 835 pages.
3GPP, "Technical Specification Group Radio Access Network; NR; Multiplexing and channel coding (Release 16)," 3GPP TS 38.212 V16.1.0 (Mar. 2020), 5G, 146 pages.
3GPP, "Technical Specification Group Radio Access Network; NR; Physical layer procedures for data (Release 16)," 3GPP TS 38.214 V16.1.0 (Mar. 2020), 5G, 151 pages.
MCC Support, "Final Report of 3GPP TSG RAN WG1 #AH_1901 v1.0.0 (Taipei, Taiwan, Jan. 21-25, 2019)," 3GPP TSG RAN WG1 Meeting #96, R1-1901483, Feb. 25-Mar. 1, 2019, Athens, Greece, 104 pages.

\* cited by examiner

COVERAGE ENHANCEMENT FOR PHYSICAL UPLINK CONTROL CHANNEL TRANSMISSIONS IN NEW RADIO

CROSS REFERENCE TO RELATED APPLICATION

The present application claims priority to U.S. Provisional Patent Application No. 63/011,909, which was filed Apr. 17, 2020; U.S. Provisional Patent Application No. 63/015,364, which was filed Apr. 24, 2020; and U.S. Provisional Patent Application No. 63/052,152, which was filed Jul. 15, 2020, the disclosures of which are hereby incorporated by reference.

FIELD

Embodiments relate generally to the technical field of wireless communications. In particular, some embodiments of the present disclosure are directed to coverage enhancement techniques for PUCCH.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich content and services.

DETAILED DESCRIPTION

Figure 1:
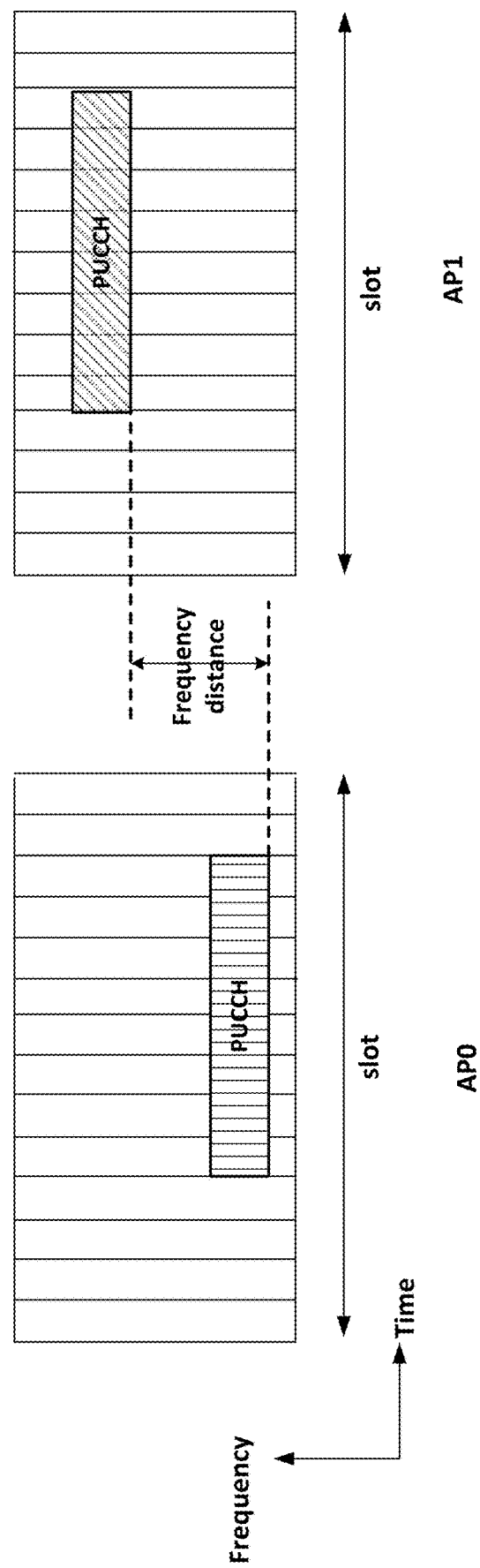
FIG. 1 illustrates an example of mapping a PUCCH transmission in different frequency resources for two APs in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

For cellular systems, coverage is an important factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink coverage is the bottleneck for system operation considering the low transmit power at the user equipment (UE) side.

In NR Rel-15, short physical uplink control channel (PUCCH) (PUCCH formats 0 and 2) can span 1 or 2 symbols and long PUCCH (PUCCH formats 1, 3 and 4) can span from 4 to 14 symbols within a slot. More specifically:

PUCCH format 0 can be used to carry up to 2 uplink control information (UCI) bits; It is designed based on sequence selection mechanism, where the information bit is used to select a sequence to be transmitted. The sequence is a computer generated sequence (CGS) with length 12 and low peak-to-average power ratio (PAPR) property.

PUCCH format 1 can be used to carry up to 2 UCI bits. Further, one or two UCI bits are first modulated as BPSK or QPSK symbols and then multiplied by a CGS with length 12 and low PAPR property.

PUCCH format 2 can be used to carry more than 2 UCI bits. It is based on OFDM waveform, where demodulation reference signal (DMRS) is interleaved with the UCI symbols within the allocated resource. The number of physical resource blocks (PRB) can be configured from 1 to 16.

PUCCH format 3 can be used to carry more than 2 UCI bits. It is based on DFT-s-OFDM waveform, where DMRS and UCI symbols are multiplexed in a time division multiplexing (TDM) manner.

PUCCH format 4 can be used to carry more than 2 UCI bits and spans 1 PRB in frequency. Further, pre-discrete Fourier transform (DFT) blocked-wise sequence is applied on the modulated UCI symbols to allow multiple UEs to be multiplexed in the same PRB.

For long PUCCH (e.g., PUCCH format 1, 3 and 4), a number of slots can be configured to further enhance the coverage. Note that when repetition is employed, same time domain resource allocation (TDRA) for the transmission of PUCCH is used in each slot. Further, inter-slot frequency hopping can be configured to improve the performance by exploiting frequency diversity.

To further improve the coverage for PUCCH transmission, when a UE is equipped with multiple transmit antennas, multiple port transmission may be employed for PUCCH to exploit transmit diversity or spatial diversity. To support multiple port transmission for PUCCH, certain design changes may need to be considered for PUCCH. Among other things, embodiments of the present disclosure are directed to coverage enhancement techniques for PUCCH.

Coverage Enhancement Techniques for PUCCH

As mentioned above, for long PUCCH, (e.g., PUCCH format 1, 3 and 4), a number of slots can be configured to further enhance the coverage. Note that when repetition is employed, same time domain resource allocation (TDRA) for the transmission of PUCCH is used in each slot. Further, inter-slot frequency hopping can be configured to improve the performance by exploiting frequency diversity.

To further improve the coverage for PUCCH transmission including PUCCH format 0-4, when UE is equipped with multiple transmit antennas, multiple port transmission may be employed for PUCCH to exploit transmit diversity or spatial diversity. To support multiple port transmission for PUCCH, certain design changes may need to be considered for PUCCH.

In one embodiment, multiple port transmissions can be applied for PUCCH transmission. This can be applied for all PUCCH formats, including PUCCH format 0, 1, 2, 3, 4. Further, different resources in code, frequency and time domain can be allocated in different antenna ports (APs) for the transmission of PUCCHs. In particular, PUCCH transmission on each AP can be mapped onto different time or frequency resources for different APs.

Note that PUCCH transmissions on different APs can be mapped to different frequency resources, e.g., different physical resource blocks (PRB). For each AP, PUCCH transmission is mapped to consecutive PRBs. In one example, when the number of APs is 2, the distance between starting PRB of PUCCH transmission in frequency for two APs can be predefined in the specification or configured by higher layers via dedicated radio resource control (RRC) signaling. In the latter case, the distance between starting position of PUCCH transmission in frequency for two APs can be configured per PUCCH format. Note that for each AP, same number of PRBs for PUCCH transmission can be configured as a common parameter for each AP. Note that the same design principle can be straightforwardly extended to the case when the number of APs is 4.

Alternatively, the starting PRB for PUCCH transmission for each AP can be configured via dedicated RRC signaling. Similar as the above option, the number of PRBs for PUCCH transmission for each AP can be configured as a common parameter.

Yet in another option, the starting PRB for PUCCH transmission for different APs can be determined in accordance with initial or active UL bandwidth part (BWP) BW. In one example, when the number of APs is 2, the distance between starting PRB of PUCCH transmission for two APs can be $$\left\lfloor \frac{N_{PRB}^{BWP}}{2} \right\rfloor,$$

where $N_{PRB}^{BWP}$ is the number of PRBs in the initial or active UL BWP.

In another example, the allocation of PUCCH transmission in frequency for two APs follows a mirrored pattern within the initial or active UL BWP. In this case, the starting PRB for PUCCH transmission for the second AP can be determined as $$n_{PRB}^{(p_1)} = N_{PRB}^{BWP} - 1 - n_{PRB}^{(p_0)}$$

Where $n_{PRB}^{(p_0)}$ and $n_{PRB}^{(p_1)}$ are the starting PRB for PUCCH transmission for the first and second AP, respectively. Note that for PUCCH transmission, antenna port index $p_0=2000$ and $p_1=2001$. It can be straightforwardly extended to the case when the number of APs is 4, e.g., by mirroring of even and odd APs (AP #1 and AP #3, AP #2 and AP #4) within the initial or active UL BWP.

Note that when intra-slot frequency hopping is applied for the transmission of PUCCH, the above options can be applied for the first and second hop, respectively.

FIG. 1 illustrates one example of mapping a PUCCH transmission in different frequency resources for two APs. In the example, the distance between the starting PRB index of PUCCH transmission for two APs is half of the BWP BW.

In another embodiment, interleaved PUCCH transmission for different APs can be employed. More specifically, PUCCH transmission resources for different APs are mapped to different subcarriers or physical resource blocks (PRBs) in an interleaved manner. This may depend on the PUCCH format. For instance, when the number of PRBs for PUCCH format is 1, interleaved PUCCH transmission on subcarrier level may be considered. When the number of PRBs for PUCCH format is larger than 1, interleaved PUCCH transmission may be designed on PRB level. For this option, DMRS can be mapped on the same resource as the PUCCH transmission for each AP.

Figure 2:
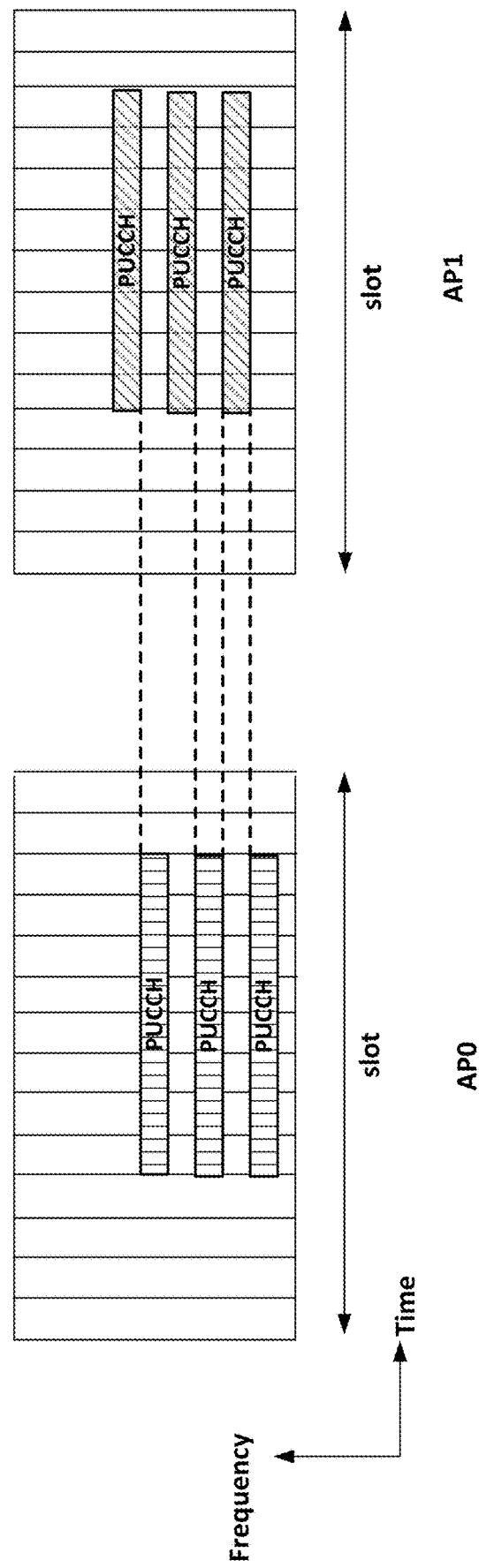
FIG. 2 illustrates an example of an interleaved PUCCH transmission on two APs in accordance with various embodiments.

FIG. 2 illustrates one example of interleaved PUCCH transmission on two APs. In the figure, PUCCH transmission on two APs are mapped to different PRBs in an interleaved manner.

Note that the above embodiments can be straightforwardly extended to the case when different time resources are configured for PUCCH transmission with different APs. In one example, the time domain resources for two APs are consecutive in a slot for the transmission of PUCCH. In another example, interleaved transmission in time is used for the PUCCH transmission with two APs. In particular, PUCCH for two APs is transmitted in different symbols in an interleaved manner.

In another embodiment, as mentioned above, different code domain resources can be configured or allocated for the transmission of PUCCH for different APs. In particular, this mechanism can be applied for all PUCCH formats, including PUCCH format 0, 1, 2, 3 and 4.

In one option, for PUCCH format 0, different cyclic shift values can be employed for the transmission of PUCCH on different APs. This can apply for the case when 1-bit or 2-bit hybrid automatic repeat request-acknowledgement (HARQ-ACK), scheduling request (SR) and/or in case when the HARQ-ACK and positive SR for PUCCH format 0 overlap in time.

In particular, in order to support two APs for 1-bit HARQ-ACK feedback, the following Table 9.2.3-3 in TS 38.213, v. 16.1.0, 2020-04-03, can be updated as follows:

| HARQ-ACK Value | 0 | 1 |
|---|---|---|
| Sequence cyclic shift, first AP ($p_0$) | $m_{cs} = 0$ | $m_{cs} = 6$ |
| Sequence cyclic shift, second AP ($p_1$) | $m_{cs} = m_{cs,\Delta_0}$ | $m_{cs} = 6 + m_{cs,\Delta_0}$ |

Similarly, in order to support two APs for SR, the following text in Section 9.2.4 in TS 38.213 can be updated as follows:

The UE transmits a PUCCH in the PUCCH resource for the corresponding SR configuration only when the UE transmits a positive SR. For a positive SR transmission using PUCCH format 0, the UE transmits the PUCCH as described in TS 38.211, v. 16.1.0, 2020-04-03, by obtaining $m_0$ as described for HARQ-ACK information in Subclause 9.2.3 and by setting $m_{cs}=0$ for a first AP $p_0$ and $m_{cs}=m_{CS,SR}$ for a second AP $p_1$. For a positive SR transmission using PUCCH format 1, the UE transmits the PUCCH as described in TS 38.211 by setting b(0)=0.

Further, in order to support two APs for 1-bit HARQ-ACK and positive SR, the following Table 9.2.5-1 in TS 38.213 can be updated as follows:

| HARQ-ACK Value | 0 | 1 |
|---|---|---|
| Sequence cyclic shift, first AP ($p_0$) | $m_{cs} = 3$ | $m_{cs} = 9$ |
| Sequence cyclic shift, second AP ($p_1$) | $m_{cs} = 3 + m_{cs,\Delta_1}$ | $m_{cs} = 9 + m_{cs,\Delta_1}$ |

Note that in the above mechanisms, $m_{CS,\Delta_0}$, $m_{CS,SR}$ and $m_{CS,\Delta_1}$ are the cyclic shift offset between the first and second AP, which can be predefined in the specification or configured by higher layers via minimum system information (MSI), remaining minimum system information (RMSI), other system information (OSI) or dedicated radio resource control (RRC) signaling. It can be configured per PUCCH resource. In the former case, $m_{CS,\Delta_0}$ can be fixed to 1, 2, or 3. $m_{CS,\Delta_1}$ can be 1 or 2. $m_{CS,SR}$ can be fixed to 3 or 6.

Further, the above designs can also be applied for the case of 2-bit HARQ-ACK feedback and when 2-bit HARQ-ACK and positive SR for PUCCH format 0 overlap in time.

In another embodiment, for PUCCH format 1, different cyclic shift values and/or orthogonal cover codes (OCC) can be employed for the transmission of PUCCH on different APs.

In one option, different cyclic shifts can be used for different APs for generation of complex value symbols for PUCCH format 1. In particular, the following text in Section 6.3.2.4.1 in TS 38.211 can be updated to support two APs for PUCCH format 1 as shown below.

The complex-valued symbol d(0) shall be multiplied with a sequence $r_{u,v}^{(\alpha^{(\tilde{p}_i)},\delta)}(n)$ according to $$y^{(p_i)}(n)=d(0)r_{u,v}^{(\alpha^{(\tilde{p}_i)},\delta)}(n)$$

$$n=0,1,\ldots,N_{sc}^{RB}-1$$

where $r_{u,v}^{(\alpha,\delta)}(n)$ is given by clause 6.3.2.2, $p_i$ is the antenna port index and $p=2000+\tilde{p}_i$. Note that for PUCCH transmissions, when the number of APs is 2, antenna port index $p_0=2000$ and $p_1=2001$. Further, $p_i=2000+\tilde{p}_i$. This indicates that when $p_0=2000$, $\tilde{p}_0=0$ and $p_1=2001$, $\tilde{p}_1=1$. The same can be straightforwardly extended to the case when the number of APs is 4.

In another option, different orthogonal sequences can be used for different APs for PUCCH format 1. In particular, the following text in Section 6.3.2.4.1 in TS 38.211 can be updated to support 2 APs for PUCCH format 1 as shown below.

The block of complex-valued symbols y(0), . . . , y ($N_{sc}^{RB}-1$) shall be block-wise spread with the orthogonal sequence $w_i^{(\tilde{p}_i)}(m)$ according to $$z^{(p_i)}(m'N_{sc}^{RB}N_{sF,0}^{PUCCH,1} + mN_{sc}^{RB} + n) = w_i^{(\tilde{p}_i)}(m)y(n)$$

$$n = 0, 1, \ldots, N_{sc}^{RB} - 1$$

$$m = 0, 1, \ldots, N_{sF,0}^{PUCCH,1} - 1$$

$$m' = \begin{cases} 0 & \text{no intra-slot frequency hopping} \\ 0, 1 & \text{no intra-slot frequency hopping} \end{cases}$$

Where $p_i$ is the antenna port index and $p_i=2000+\tilde{p}_i$. $N_{SF,m'}^{PUCCH,1}$ is given by Table 6.3.2.4.1-1.

Note that the aforementioned mechanism can be applied for the DMRS generation for PUCCH format 1 with more than one AP.

In another embodiment, a different orthogonal cover code (OCC) can be applied for different APs for the transmission of PUCCH format 2. In particular, the following text in Section 6.3.2.5.2A in TS38.211 can be updated as shown below to support transmit diversity of PUCCH format 2.

Spreading for antenna port $p_i$ shall be applied according to $$z^{(pi)}(mN_{SF}^{PUCCH,2}+i)=w_n^{(\tilde{p}i)}(i)d(m)$$

$$i=0,1,\ldots,N_{SF}^{PUCCH,2}-1$$

$$m=0,1,\ldots,M_{symb}-1$$

resulting in a block of complex-valued symbols $z^{(pi)}$(0), . . . , $z^{(pi)}(N_{SF}^{PUCCH,2}M_{symb}-1)$, where $p_i$ is the antenna port index and $p_i=2000+\tilde{p}_i$.

Further, DMRS for different APs for PUCCH format 2 can be based on different OCCs, which is similar to the UCI transmission. In particular, the following text in Section 6.4.1.3.2.1 in TS38.211 can be updated as shown below.

The reference-signal sequence for antenna port $p_i$, $z_l^{(pi)}$(m) shall be generated according to $$z_l^{(p_i)}(mN_{SF}^{PUCCH,2} + i) = w_n^{(\tilde{p}_i)}(i)r_l(m)$$

$$r_l(m) = \frac{1}{\sqrt{2}}(1 - 2c(2m)) + j\frac{1}{\sqrt{2}}(1 - 2c(2m + 1))$$

$$i = 0, 1, \ldots, LN_{SF}^{PUCCH,2} - 1$$

$$m = 0, 1, \ldots$$

where $p_i$ is the antenna port index and $p_i=2000+\tilde{p}_i$, the pseudo-random sequence c(i) . . . .

In another embodiment, different pre-DFT orthogonal cover code (OCC) or blocked wise spreading sequences may be assigned in different antenna ports (AP) for the transmission of PUCCH format 3 with interlaced mapping and PUCCH format 4.

Figure 3:
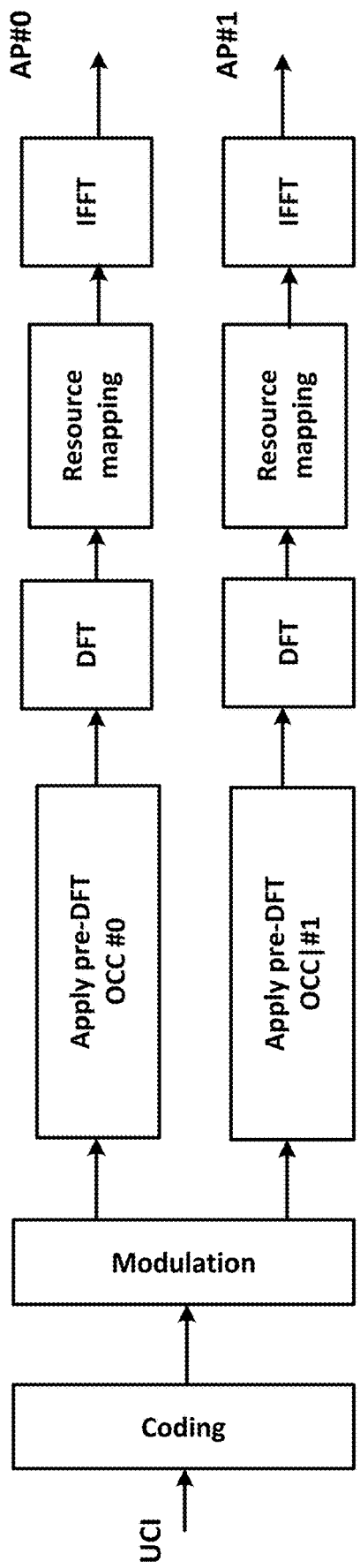
FIG. 3 illustrates an example of transmit diversity for PUCCH format 3 with interlaced mapping and format 4 with two APs in accordance with various embodiments.

FIG. 3 illustrates the transmit diversity for PUCCH format 3 with interlaced mapping and format 4 with two APs. In the figure, two different pre-DFT OCCs or blocked wise spreading sequences are used for the transmission of PUCCH format 3 with interlaced mapping and PUCCH format 4 in different APs. Note that after applying the pre-DFT OCC or blocked wise spreading sequences, UCI symbols on AP #0 and AP #1 are allocated on the even and odd subcarrier, respectively.

To support transmit diversity for PUCCH format 3 with interlaced mapping and PUCCH format 4, Section 6.3.2.6 in TS38.211 can be updated as follows.

For PUCCH format 3 with interlaced mapping and PUCCH format 4, block-wise spreading shall be applied according to $$y^{(p_i)}(lM_{sc}^{PUCCH,s} + k) =$$

$$w_n^{(p_i)}\left(\left\lfloor k \frac{N_{SF}^{PUCCH,s}}{M_{sc}^{PUCCH,s}} \right\rfloor\right) d\left(l\frac{M_{sc}^{PUCCH,s}}{N_{SF}^{PUCCH,s}} + k \bmod \frac{M_{sc}^{PUCCH,s}}{N_{SF}^{PUCCH,s}}\right)$$

$$k = 0, 1, \ldots, M_{sc}^{PUCCH,s} - 1$$

$$l = 0, 1, \ldots, (N_{SF}^{PUCCH,s} M_{symb}/M_{sc}^{PUCCH,s}) - 1$$

where for PUCCH format 3 with interlaced mapping, $N_{SF}^{PUCCH,3} \in \{1,2,4\}$ if a single interlace is configured and $N_{SF}^{PUCCH,3}=1$, $w_n=1$ if two interlaces are configured;

for PUCCH format 4, $M_{RB}^{PUCCH,4}=1$, $N_{SF}^{PUCCH,4} \in \{2, 4\}$;

$p_i$ is the antenna port index and $p_i=2000+\tilde{p}_i$, and $w_n$ is given by Tables 6.3.2.6.3-1 and 6.3.2.6.3-2 for $N_{SF}^{PUCCH,s}>1$ where n is the index of the orthogonal sequence to use according to clause 9.2.1 of TS 38.213.

In another embodiment, for the aforementioned embodiments, OCC index for PUCCH format 1 and 2, blocked wise spreading sequence index for PUCCH format 3 and 4 may be implicitly determined by the AP index for PUCCH transmission. In one example, when the spreading factor is 2 and the number of APs is 2, one to one mapping is used to determine the OCC index and/or blocked wise spreading sequence index from the AP index, e.g., $n=\tilde{p}_i$, where n is the OCC index and/or blocked wise spreading sequence index for each AP and $\tilde{p}_i$ is the supported AP index.

In another option, the OCC index and/or blocked wise spreading sequence index can be configured explicitly by higher layers via dedicated radio resource control (RRC) signalling. It can be part of PUCCH resource configuration. In this case, OCC index and/or blocked wise spreading sequence index is configured per each AP for PUCCH format 1 and 2; PUCCH format 3 and 4, respectively.

Yet in another option, the OCC index and/or blocked wise spreading sequence index for the first AP for the transmission of PUCCH format 1 and 2; as well as PUCCH format 3 and 4 can be configured by higher layers via RRC signaling. Then, OCC index and/or blocked wise spreading sequence index for the subsequent AP can be derived implicitly. For instance, the OCC index and/or blocked wise spreading sequence index is incremented by 1 when the AP index is increased by 1. In this case, when the OCC index and/or blocked wise spreading sequence index for the first AP is configured as 0, then the OCC index and/or blocked wise spreading sequence index for the second AP is derived as 1.

Further, the cyclic shift index for DMRS sequence generation for PUCCH format 1, PUCCH format 3 and/or format 4 for each AP can be determined in accordance with the spreading sequence index. In another option, it can be configured by higher layers via RRC signaling per each AP.

Similar processes can be applied for the DMRS sequence generation for PUCCH format 1 and 2. In particular, the OCC index for DMRS sequence generation for PUCCH format 1 and 2 can be determined in accordance with the spreading sequence index. In another option, it can be configured by higher layers via RRC signaling per each AP.

In another embodiment, transmit diversity can be applied for the transmission of PUCCH format 2 as a multiple port transmission scheme. In particular, space-frequency block code (SFBC) or space-time block code (STBC) can be used for PUCCH format 2 transmission.

Figure 4:
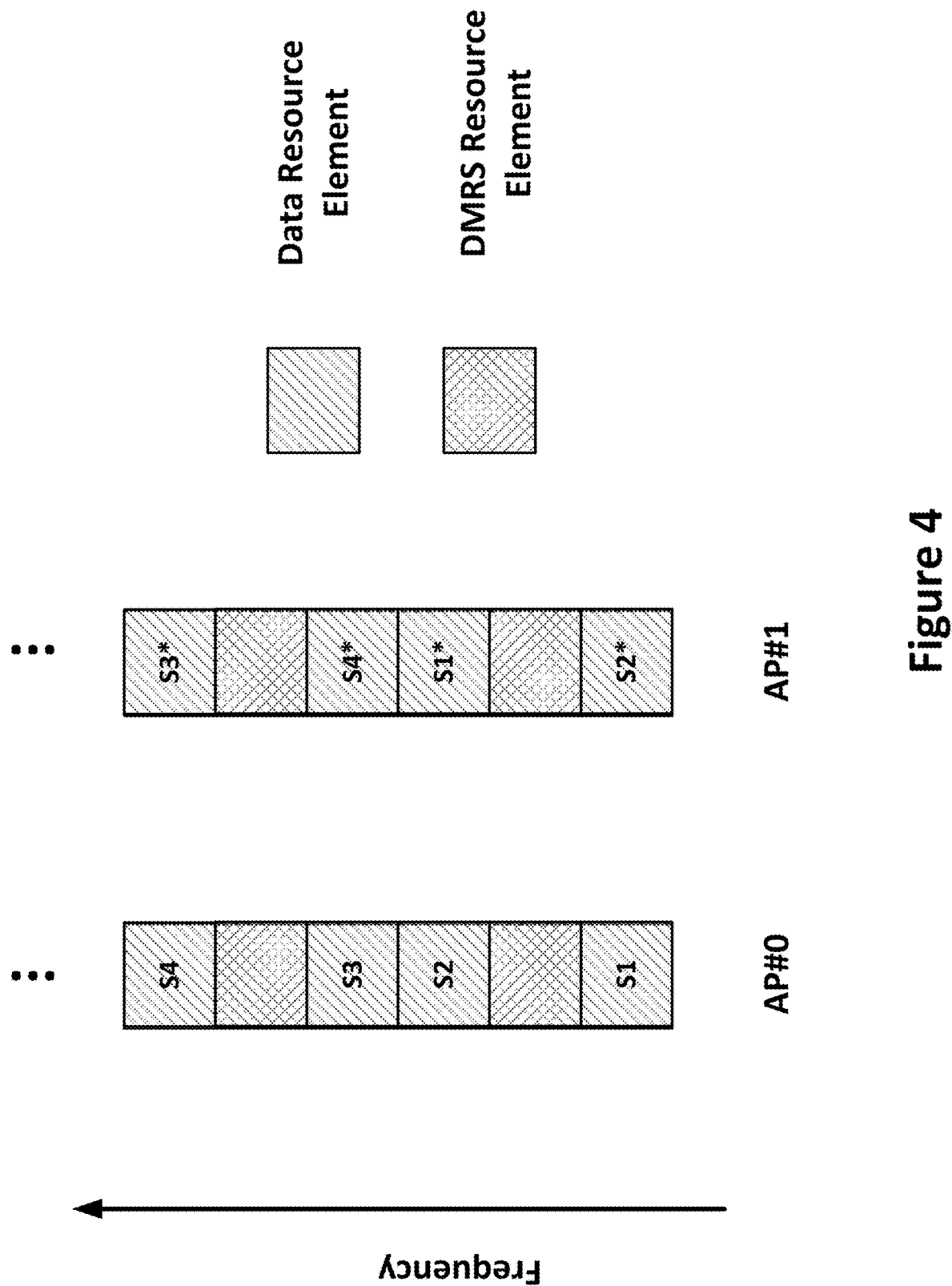
FIG. 4 illustrates an example of space frequency block code (SFBC) schemes for PUCCH transmissions with two APs in accordance with various embodiments.

FIG. 4 illustrates the design principle for SFBC schemes for the transmission of PUCCH format 2 with 2 APs.

Figure 5:
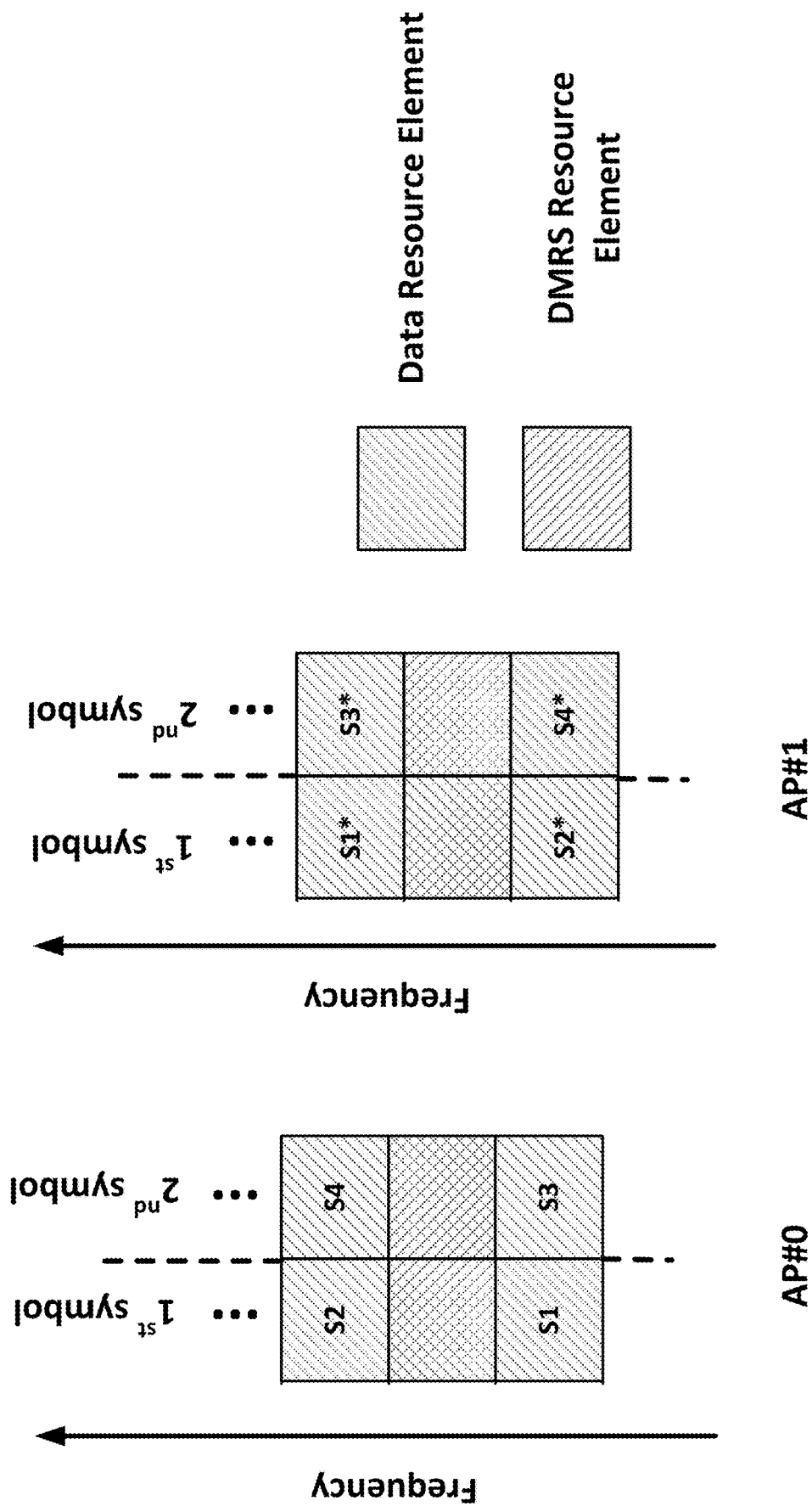
FIG. 5 illustrates an example of space-time block code (STBC) for PUCCH transmission with 2 APs in accordance with various embodiments.

FIG. 5 illustrates the design principle for STBC schemes for the transmission of PUCCH format 2 with 2 APs:

Note that SFBC scheme can be used for each symbol separately and can be applied for the case of single symbol PUCCH format 2 transmission, 2 symbols transmission with and without intra-slot frequency hopping. STBC scheme can be applied for two consecutive symbols and can be used for the case of PUCCH format 2 with 2 symbols transmission when intra-slot frequency hopping is disabled.

Further, the mapping matrix for the STBC and SFBC for PUCCH transmission with 2 APs can be determined as:

$$\begin{bmatrix} S_1 & -S_2^* \\ S_2 & S_1^* \end{bmatrix}$$

Note that a different mapping matrix can also be employed for the STBC and SFBC for PUCCH transmission with 2 APs as follows:

$$\begin{bmatrix} S_1 & S_2 \\ -S_2^* & S_1^* \end{bmatrix}, \begin{bmatrix} S_1^* & S_2 \\ -S_2^* & S_1 \end{bmatrix}, \begin{bmatrix} S_1^* & -S_2^* \\ S_2 & S_1 \end{bmatrix}.$$

Note that for some of the above embodiments, two APs are used for transmit diversity of PUCCH transmission. However, embodiments of the present disclosure may be applied to cases of four APs as well.

In one embodiment, if a UE does not have dedicated PUCCH resource configuration, or UE uses PUCCH common resource set for HARQ-ACK feedback, single port transmission is used for PUCCH transmission.

Further, PUCCH with more than one port transmission can be configured by higher layers via dedicated RRC signalling. It can be configured per PUCCH resource or per PUCCH format or per PUCCH resource set.

In one example, PUCCH with two port transmission can be configured per PUCCH resource. An example of updated text in the PUCCH-Config in TS 38.331, v. 16.0.0, 2020-04-06, is indicated below in bold.
PUCCH-Resource::=SEQUENCE {
  pucch-ResourceId PUCCH-ResourceId,
  startingPRB PRB-Id,
  intraSlotFrequencyHopping ENUMERATED enabled}
OPTIONAL, —Need R
  secondHopPRB PRB-Id OPTIONAL, —Need R
  twoPortTransmission ENUMERATED {enabled}
    OPTIONAL, —Need R
  format CHOICE {
  format0 PUCCH-format0,
  format1 PUCCH-format1,
  format2 PUCCH-format2,
  format3 PUCCH-format3,
  format4 PUCCH-format4
  }
}

In another example, PUCCH with two port transmission can be configured per PUCCH format. An example of updated text in the PUCCH-Config in TS 38.331 is indicated below in bold. Note that depending on which PUCCH format can be defined with two port transmission, some of the configurations with two port transmission for PUCCH format may not be needed.

PUCCH-format0::=SEQUENCE {
    initialCyclicShift INTEGER(0 . . . 11),
    nrofSymbols INTEGER (1 . . . 2),
    startingSymbolIndex INTEGER(0 . . . 13),
    twoPortTransmission ENUMERATED {enabled} OPTIONAL, —Need R
}
PUCCH-format1::=SEQUENCE {
    initialCyclicShift INTEGER(0 . . . 11),
    nrofSymbols INTEGER (4 . . . 14),
    startingSymbolIndex INTEGER(0 . . . 10),
    timeDomainOCC INTEGER(0 . . . 6),
    twoPortTransmission ENUMERATED {enabled} OPTIONAL, —Need R
}
PUCCH-format2::=SEQUENCE {
    nrofPRBs INTEGER (1 . . . 16),
    nrofSymbols INTEGER (1 . . . 2),
    startingSymbolIndex INTEGER(0 . . . 13),
    twoPortTransmission ENUMERATED {enabled} OPTIONAL, —Need R
}
PUCCH-format3::=SEQUENCE {
    nrofPRBs INTEGER (1 . . . 16),
    nrofSymbols INTEGER (4 . . . 14),
    startingSymbolIndex INTEGER(0 . . . 10),
    twoPortTransmission ENUMERATED {enabled} OPTIONAL, —Need R
}
PUCCH-format4::=SEQUENCE
    nrofSymbols INTEGER (4 . . . 14),
    occ-Length ENUMERATED {n2, n4},
    occ-Index ENUMERATED {n0, n1, n2, n3},
    startingSymbolIndex INTEGER(0 . . . 10)
    twoPortTransmission ENUMERATED {enabled} OPTIONAL, —Need R
    }
Low PAPR DMRS Sequence Hopping for PUCCH Various embodiments herein are related to NR MIMO Low PAPR Reference Signal Design for physical uplink control channel.

In Rel-15 NR, for the case of pi/2 BPSK modulated DFT-S-OFDM based PUCCH Format 3 and 4, the corresponding demodulation reference signals (DMRSs) are generated in the frequency domain based on computer generated sequences (CGS) for sequence length less than 30 and Zaddoff-Chu Sequences for sequence length greater than equal to 30. For the case when pi/2 BPSK modulation is used for PUCCH, the PAPR of the DMRS is degraded compared to the control channel data especially when pulse shaping is used. In Rel-16 NR, pre-DFT time domain binary CGS sequences of length 12, 24 and pseudo-random Gold Sequence for sequence lengths of 30 and greater mapped to pi/2-BPSK constellation are used.

This disclosure describes methods for sequence hopping for Rel-16 pi/2-BPSK DM-RS CGS of length sequences used for PUCCH Formats 3 and 4.

In NR Rel-15, $M_{sc}^{PUCCH,s} = M_{RB}^{PUCCH,s} N_{sc}^{RB}$ with $M_{RB}^{PUCCH,s}$ representing the bandwidth of the PUCCH in terms of physical resource blocks (PRBs) according and $N_{sc}^{RB}$ is the number of subcarriers in physical resource block and for non-interlaced mapping fulfils $$M_{RB}^{PUCCH,s} = \begin{cases} 2^{\alpha_2} \cdot 3^{\alpha_3} \cdot 5^{\alpha_5} & \text{for PUCCH format 3} \\ 1 & \text{for PUCCH format 4} \end{cases}$$

where $\alpha_2 \cdot \alpha_3 \cdot \alpha_5$ is a set of non-negative integers and $s \in \{3,4\}$ For interlaced mapping, $M_{RB}^{PUCCH,3}=10$ if a single interlace is configured and $M_{RB}^{PUCCH,3}=20$ if two interlaces are configured.

For the case of PUCCH format 3 with $M_{RB}^{PUCCH,3} \leq 2$ and for PUCCH format 4 where $M_{RB}^{PUCCH,4}=1$, computer generated pre-DFT binary sequences modulated by pi/2-BPSK are used. The sequence lengths are 12 and 24 respectively for $M_{RB}^{PUCCH,s}=1, 2$.

In Rel-15 NR, for the purpose of interference randomization for UEs across different cells, cyclic shift hopping is used along with CGS or ZC sequences e.g., $$r_{u,v}^{(\alpha,\delta)}(n) = e^{j\alpha n} \bar{r}_{u,v}(n), 0 \leq n < M_{ZC}$$

where $M_{ZC} = M_{sc}^{PUCCH,s}$ is the length of the sequence. Multiple sequences are defined from a single base sequence through different values of the cyclic shift $\alpha$. Cyclic shift hopping is used such that the value of $\alpha$ varies across slots and OFDM symbols within a slot. This ensures that even with the same base sequence $\bar{r}_{u,v}(n)$ different cyclic shifts produce different orthogonal sequences leading to interference randomization across cell in the case that two UEs in different cells select the same base sequence.

For the case of Rel-16 NR for PUCCH with pi/2-BPSK modulation, new CGS sequences of lengths 12 and 24 were defined as in Tables 5.2.2.2-2 and 5.2.2.2-4 in TS 38.211. However, these sets of $u \in \{0, 2, \ldots, 29\}$ sequences are not constant modulus in the frequency domain and using cyclic shift hopping does not produce orthogonal sequences. In some cases, the cyclic shift can produce identical sequences leading to very harmful inter-cell interference.

In Rel-15 sequence group hopping is used to choose of one of $u \in \{0, 1, 2 \ldots, 29\}$ sequences in TS 38.211. The sequence group $u = (f_{gh} + f_{ss}) \mod 30$ and the sequence number v within the group depends on the higher-layer parameter pucch-GroupHopping:

if pucch-GroupHopping equals 'neither'

$f_{gh} = 0$ $f_{ss} = n_{ID} \mod 30$ $v = 0$ where $n_{ID}$ is given by the higher-layer parameter hoppingId if configured, otherwise $n_{ID} = N_{ID}^{cell}$.

if pucch-GroupHopping equals 'enable'

$f_{gh} = \left( \sum_{m=0}^{7} 2^m c\left(8\left(2n_{s,f}^{\mu} + n_{hop}\right) + m\right) \right) \mod 30$ $f_{ss} = n_{ID} \mod 30$ $v = 0$ where $n_{s,f}^{\mu}$ is the slot number within a frame for subcarrier spacing configuration $\mu$; the pseudo-random sequence) is defined by clause 5.2.1 of TS 38.211 and shall be initialized at the beginning of each radio frame with $c_{init}=\lfloor n_{ID}/30 \rfloor$ where $n_{ID}$ is given by the higher-layer parameter hoppingId if configured, otherwise $n_{ID}=N_{ID}^{cell}$.

if pucch-GroupHopping equals 'disable'

$$f_{gh}=0$$

$$f_{ss}=n_{ID} \bmod 30$$

$$v=c(2n_{s,f}^{\mu}+n_{hop})$$

where the pseudo-random sequence c(i) is defined by clause 5.2.1 of TS 38.211 and shall be initialized at the beginning of each radio frame with $c_{init}=2^5\lfloor n_{ID}/30 \rfloor+(n_{ID} \bmod 30)$ where $n_{ID}$ is given by the higher-layer parameter hoppingId if configured, otherwise $n_{ID}=N_{ID}^{cell}$.

The frequency hopping index $n_{hop}=0$ if intra-slot frequency hopping is disabled by the higher-layer parameter intraSlotFrequencyHopping. If frequency hopping is enabled by the higher-layer parameter intraSlotFrequencyHopping, $n_{hop}=0$ for the first hop and $n_{hop}=1$ for the second hop.

In Rel-16 NR, low PAPR sequence generation Type 2 has been defined in TS 38.211 for pi/2-BPSK DMRS wherein the low-PAPR sequence $r_{u,v}^{(\alpha,\delta)}(n)$ is defined by a base sequence $\bar{r}_{u,v}(n)$ according to:

$$r_{u,v}^{(\alpha,\delta)}(n)=\bar{r}_{u,v}(n), 0 \leq n < M$$

where $M=mN_{sc}^{RB}/2^\delta$ is the length of the sequence.

Base sequences $\bar{r}_{u,v}(n)$ are divided into groups, where $u \in \{0, 1, \ldots, 29\}$ is the group number and v is the base sequence number within the group, such that each group contains one base sequence (v=0) of length $M=mN_{sc}^{RB}/2^\delta$, $\frac{1}{2} \leq m/2^\delta$. The sequence $\bar{r}_{u,v}(0), \ldots, \bar{r}_{u,v}(M-1)$ is defined by:

$$\bar{r}_{u,v}(n) = \frac{1}{\sqrt{M}} \sum_{i=0}^{M-1} \tilde{r}_{u,v}(i) e^{-j\frac{2\pi i n}{M}}$$

$$n = 0, \ldots, M-1$$

where the definition of $\tilde{r}_{u,v}(i)$ depends on the sequence length.

The sequence group hopping defined in Rel-15 NR for PUCCH formats 3 and 4 where group number u is given as $u=(f_{gh}+f_{ss}) \bmod 30$ with:

$$f_{gh} = \left(\sum_{m=0}^{7} 2^m c\left(8\left(2n_{s,f}^{\mu}+n_{hop}\right)+m\right)\right) \bmod 30,$$

which depends only on the slot number $n_{s,f}^{\mu}$ and the frequency hopping index $n_{hop}$. Therefore, in the case that two UEs select the same u across different cells in the first DM-RS symbol of PUCCH, the remaining symbols in case of multiple PUCCH DM-RS will also have the same sequence leading to a collision of DM-RS across cells and causing high inter-cell interference.

In one embodiment of this disclosure, we propose to use sequence group hopping for PUCCH formats 3 and 4 for the case when pi/2-BPSK based Rel-156 DM-RS sequence are used, such that the group hopping is dependent on the slot index as well as the OFDM symbol index within a slot. An example of such a sequence group hopping can be as follows:

$$f_{gh} = \left(\sum_{m=0}^{7} 2^m c\left(8\left(N_{symb}^{slot}n_{s,f}^{\mu}+l+n_{hop}\right)+m\right)\right) \bmod 30$$

where $N_{symb}^{slot}$ is the number of OFDM symbols in a slot and l is the OFDM symbol number in the PUCCH transmission where l=0 corresponds to the first OFDM symbol of the PUCCH transmission. the pseudo-random sequence c(i) is defined by clause 5.2.1 of TS 38.211 and shall be initialized at the beginning of each radio frame with $c_{init}=\lfloor n_{ID}/30 \rfloor$ where $n_{ID}$ is given by the higher-layer parameter hoppingId if configured, otherwise $n_{ID}=N_{ID}^{cell}$.

In another embodiment, the sequence group hopping for PUCCH can be defined as:

$$f_{gh} = \left(\sum_{m=0}^{7} 2^m c\left(8\left(N_{symb}^{slot}n_{s,f}^{\mu}+l+m\right)\right)\right) \bmod 30$$

In yet another embodiment, the sequence group hopping for PUCCH can be defined as:

$$f_{gh} = \left(\sum_{m=0}^{7} 2^m c\left(8\left(N_{symb}^{slot}n_{s,f}^{\mu}+l+l'\right)+m\right)\right) \bmod 30,$$

where
l is the OFDM symbol number in the PUCCH transmission where l=0 corresponds to the first OFDM symbol of the PUCCH transmission,
l' is the index of the OFDM symbol in the slot that corresponds to the first OFDM symbol of the PUCCH transmission in the slot given by TS 38.213, and Chairman's Notes, 3GPP RAN WG1 NR Ad Hoc 1902, Taipei, Taiwan, January 2019.

In yet another embodiment, sequence group hopping can be as follows:

$$f_{gh} = \left(\sum_{m=0}^{7} 2^m c\left(8\left(N_{symb}^{slot}n_{s,f}^{\mu}+(l+l')+n_{hop}\right)+m\right)\right) \bmod 30.$$

Systems and Implementations

Figure 6:
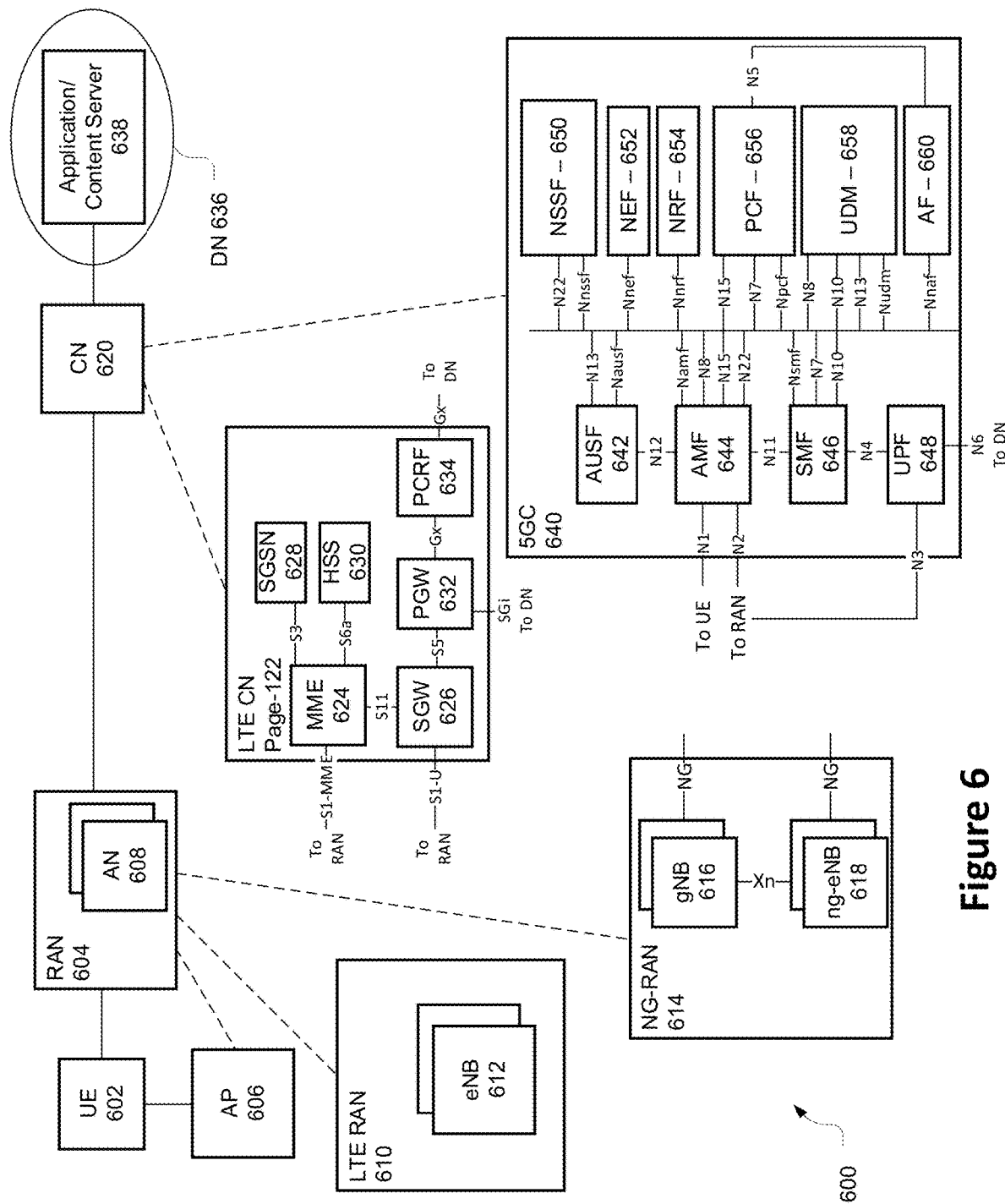
FIG. 6 illustrates an example of a network in accordance with various embodiments.
Figure 7:
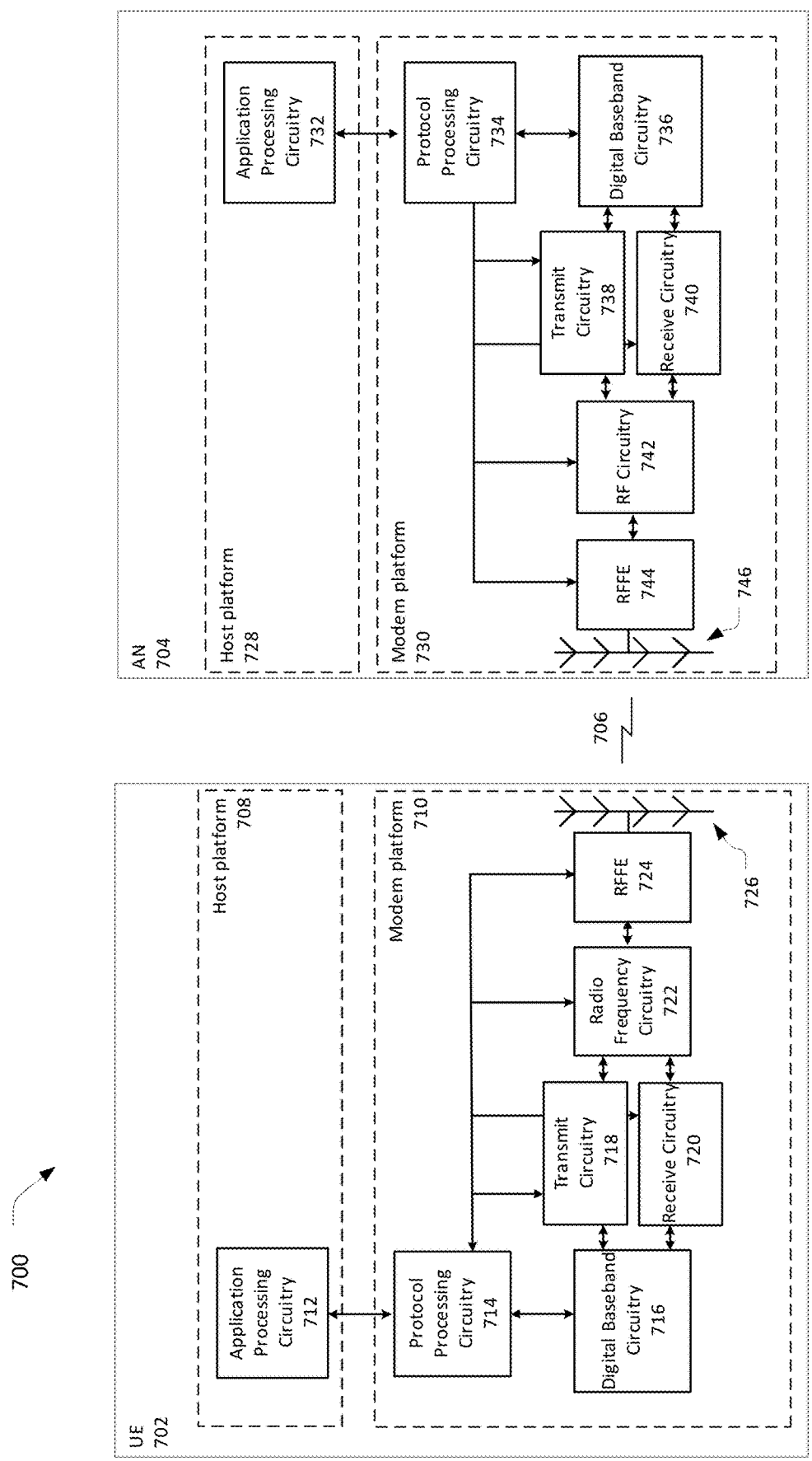
FIG. 7 illustrates an example of a wireless network in accordance with various embodiments.
Figure 8:
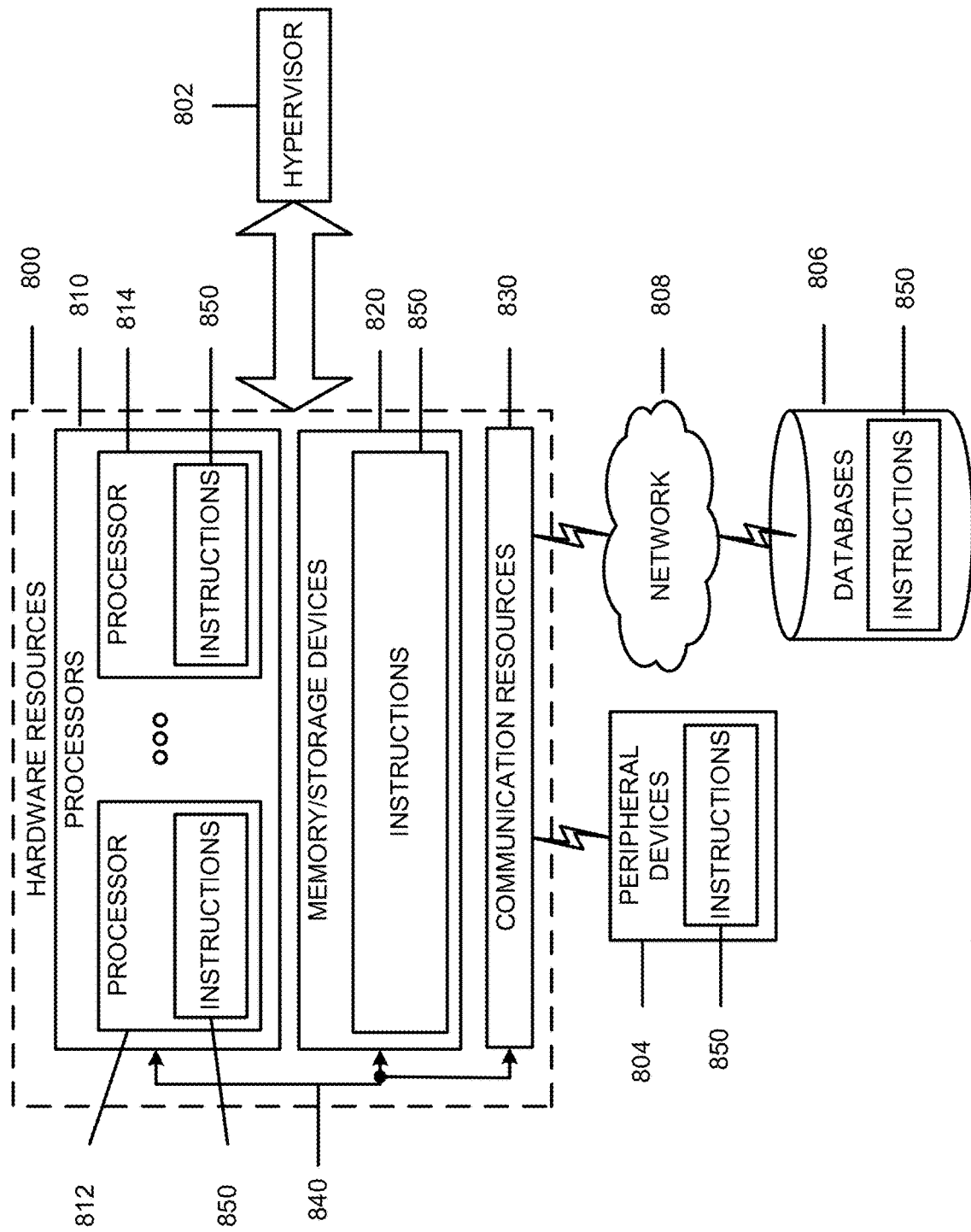
FIG. 8 illustrates an example of a block diagram illustrating components, according to some example embodiments, able to read instructions from a machine-readable or computer-readable medium (e.g., a non-transitory machine-readable storage medium) and perform any one or more of the methodologies discussed herein in accordance with various embodiments.

FIGS. 6-8 illustrate various systems, devices, and components that may implement aspects of disclosed embodiments.

FIG. 6 illustrates a network 600 in accordance with various embodiments. The network 600 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 600 may include a UE 602, which may include any mobile or non-mobile computing device designed to communicate with a RAN 604 via an over-the-air connection. The UE 602 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 600 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 602 may additionally communicate with an AP 606 via an over-the-air connection. The AP 606 may manage a WLAN connection, which may serve to offload some/all network traffic from the RAN 604. The connection between the UE 602 and the AP 606 may be consistent with any IEEE 802.11 protocol, wherein the AP 606 could be a wireless fidelity (Wi-Fi®) router. In some embodiments, the UE 602, RAN 604, and AP 606 may utilize cellular-WLAN aggregation (for example, LWA/LWIP). Cellular-WLAN aggregation may involve the UE 602 being configured by the RAN 604 to utilize both cellular radio resources and WLAN resources.

The RAN 604 may include one or more access nodes, for example, AN 608. AN 608 may terminate air-interface protocols for the UE 602 by providing access stratum protocols including RRC, PDCP, RLC, MAC, and L1 protocols. In this manner, the AN 608 may enable data/voice connectivity between CN 620 and the UE 602. In some embodiments, the AN 608 may be implemented in a discrete device or as one or more software entities running on server computers as part of, for example, a virtual network, which may be referred to as a CRAN or virtual baseband unit pool. The AN 608 be referred to as a BS, gNB, RAN node, eNB, ng-eNB, NodeB, RSU, TRxP, TRP, etc. The AN 608 may be a macrocell base station or a low power base station for providing femtocells, picocells or other like cells having smaller coverage areas, smaller user capacity, or higher bandwidth compared to macrocells.

In embodiments in which the RAN 604 includes a plurality of ANs, they may be coupled with one another via an X2 interface (if the RAN 604 is an LTE RAN) or an Xn interface (if the RAN 604 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 604 may each manage one or more cells, cell groups, component carriers, etc. to provide the UE 602 with an air interface for network access. The UE 602 may be simultaneously connected with a plurality of cells provided by the same or different ANs of the RAN 604. For example, the UE 602 and RAN 604 may use carrier aggregation to allow the UE 602 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 604 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 602 or AN 608 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 604 may be an LTE RAN 610 with eNBs, for example, eNB 612. The LTE RAN 610 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 604 may be an NG-RAN 614 with gNBs, for example, gNB 616, or ng-eNBs, for example, ng-eNB 618. The gNB 616 may connect with 5G-enabled UEs using a 5G NR interface. The gNB 616 may connect with a 5G core through an NG interface, which may include an N2 interface or an N3 interface. The ng-eNB 618 may also connect with the 5G core through an NG interface, but may connect with a UE via an LTE air interface. The gNB 616 and the ng-eNB 618 may connect with each other over an Xn interface.

In some embodiments, the NG interface may be split into two parts, an NG user plane (NG-U) interface, which carries traffic data between the nodes of the NG-RAN 614 and a UPF 648 (e.g., N3 interface), and an NG control plane (NG-C) interface, which is a signaling interface between the nodes of the NG-RAN 614 and an AMF 644 (e.g., N2 interface).

The NG-RAN 614 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 602 can be configured with multiple BWPs where each BWP configuration has a different SCS. When a BWP change is indicated to the UE 602, the SCS of the transmission is changed as well. Another use case example of BWP is related to power saving. In particular, multiple BWPs can be configured for the UE 602 with different amount of frequency resources (for example, PRBs) to support data transmission under different traffic loading scenarios. A BWP containing a smaller number of PRBs can be used for data transmission with small traffic load while allowing power saving at the UE 602 and in some cases at the gNB 616. A BWP containing a larger number of PRBs can be used for scenarios with higher traffic load.

The RAN 604 is communicatively coupled to CN 620 that includes network elements to provide various functions to support data and telecommunications services to customers/subscribers (for example, users of UE 602). The components of the CN 620 may be implemented in one physical node or separate physical nodes. In some embodiments, NFV may be utilized to virtualize any or all of the functions provided by the network elements of the CN 620 onto physical compute/storage resources in servers, switches, etc. A logical instantiation of the CN 620 may be referred to as a network slice, and a logical instantiation of a portion of the CN 620 may be referred to as a network sub-slice.

In some embodiments, the CN 620 may be an LTE CN 622, which may also be referred to as an EPC. The LTE CN 622 may include MME 624, SGW 626, SGSN 628, HSS 630, PGW 632, and PCRF 634 coupled with one another over interfaces (or "reference points") as shown. Functions of the elements of the LTE CN 622 may be briefly introduced as follows.

The MME 624 may implement mobility management functions to track a current location of the UE 602 to facilitate paging, bearer activation/deactivation, handovers, gateway selection, authentication, etc.

The SGW 626 may terminate an S1 interface toward the RAN and route data packets between the RAN and the LTE CN 622. The SGW 626 may be a local mobility anchor point for inter-RAN node handovers and also may provide an anchor for inter-3GPP mobility. Other responsibilities may include lawful intercept, charging, and some policy enforcement.

The SGSN 628 may track a location of the UE 602 and perform security functions and access control. In addition, the SGSN 628 may perform inter-EPC node signaling for mobility between different RAT networks; PDN and S-GW selection as specified by MME 624; MME selection for handovers; etc. The S3 reference point between the MME 624 and the SGSN 628 may enable user and bearer information exchange for inter-3GPP access network mobility in idle/active states.

The HSS 630 may include a database for network users, including subscription-related information to support the network entities' handling of communication sessions. The HSS 630 can provide support for routing/roaming, authentication, authorization, naming/addressing resolution, location dependencies, etc. An S6a reference point between the HSS 630 and the MME 624 may enable transfer of subscription and authentication data for authenticating/authorizing user access to the LTE CN 620.

The PGW 632 may terminate an SGi interface toward a data network (DN) 636 that may include an application/content server 638. The PGW 632 may route data packets between the LTE CN 622 and the data network 636. The PGW 632 may be coupled with the SGW 626 by an S5 reference point to facilitate user plane tunneling and tunnel management. The PGW 632 may further include a node for policy enforcement and charging data collection (for example, PCEF). Additionally, the SGi reference point between the PGW 632 and the data network 636 may be an operator external public, a private PDN, or an intra-operator packet data network, for example, for provision of IMS services. The PGW 632 may be coupled with a PCRF 634 via a Gx reference point.

The PCRF 634 is the policy and charging control element of the LTE CN 622. The PCRF 634 may be communicatively coupled to the app/content server 638 to determine appropriate QoS and charging parameters for service flows. The PCRF 632 may provision associated rules into a PCEF (via Gx reference point) with appropriate TFT and QCI.

In some embodiments, the CN 620 may be a 5GC 640. The 5GC 640 may include an AUSF 642, AMF 644, SMF 646, UPF 648, NSSF 650, NEF 652, NRF 654, PCF 656, UDM 658, and AF 660 coupled with one another over interfaces (or "reference points") as shown. Functions of the elements of the 5GC 640 may be briefly introduced as follows.

The AUSF 642 may store data for authentication of UE 602 and handle authentication-related functionality. The AUSF 642 may facilitate a common authentication framework for various access types. In addition to communicating with other elements of the 5GC 640 over reference points as shown, the AUSF 642 may exhibit an Nausf service-based interface.

The AMF 644 may allow other functions of the 5GC 640 to communicate with the UE 602 and the RAN 604 and to subscribe to notifications about mobility events with respect to the UE 602. The AMF 644 may be responsible for registration management (for example, for registering UE 602), connection management, reachability management, mobility management, lawful interception of AMF-related events, and access authentication and authorization. The AMF 644 may provide transport for SM messages between the UE 602 and the SMF 646, and act as a transparent proxy for routing SM messages. AMF 644 may also provide transport for SMS messages between UE 602 and an SMSF. AMF 644 may interact with the AUSF 642 and the UE 602 to perform various security anchor and context management functions. Furthermore, AMF 644 may be a termination point of a RAN CP interface, which may include or be an N2 reference point between the RAN 604 and the AMF 644; and the AMF 644 may be a termination point of NAS (N1) signaling, and perform NAS ciphering and integrity protection. AMF 644 may also support NAS signaling with the UE 602 over an N3 IWF interface.

The SMF 646 may be responsible for SM (for example, session establishment, tunnel management between UPF 648 and AN 608); UE IP address allocation and management (including optional authorization); selection and control of UP function; configuring traffic steering at UPF 648 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 644 over N2 to AN 608; and determining SSC mode of a session. SM may refer to management of a PDU session, and a PDU session or "session" may refer to a PDU connectivity service that provides or enables the exchange of PDUs between the UE 602 and the data network 636.

The UPF 648 may act as an anchor point for intra-RAT and inter-RAT mobility, an external PDU session point of interconnect to data network 636, and a branching point to support multi-homed PDU session. The UPF 648 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 648 may include an uplink classifier to support routing traffic flows to a data network.

The NSSF 650 may select a set of network slice instances serving the UE 602. The NSSF 650 may also determine allowed NSSAI and the mapping to the subscribed S-NS-SAIs, if needed. The NSSF 650 may also determine the AMF set to be used to serve the UE 602, or a list of candidate AMFs based on a suitable configuration and possibly by querying the NRF 654. The selection of a set of network slice instances for the UE 602 may be triggered by the AMF 644 with which the UE 602 is registered by interacting with the NSSF 650, which may lead to a change of AMF. The NSSF 650 may interact with the AMF 644 via an N22 reference point; and may communicate with another NSSF in a visited network via an N31 reference point (not shown). Additionally, the NSSF 650 may exhibit an Nnssf service-based interface.

The NEF 652 may securely expose services and capabilities provided by 3GPP network functions for third party, internal exposure/re-exposure, AFs (e.g., AF 660), edge computing or fog computing systems, etc. In such embodiments, the NEF 652 may authenticate, authorize, or throttle the AFs. NEF 652 may also translate information exchanged with the AF 660 and information exchanged with internal network functions. For example, the NEF 652 may translate between an AF-Service-Identifier and an internal 5GC information. NEF 652 may also receive information from other NFs based on exposed capabilities of other NFs. This information may be stored at the NEF 652 as structured data, or at a data storage NF using standardized interfaces. The stored information can then be re-exposed by the NEF 652 to other NFs and AFs, or used for other purposes such as analytics. Additionally, the NEF 652 may exhibit an Nnef service-based interface.

The NRF 654 may support service discovery functions, receive NF discovery requests from NF instances, and provide the information of the discovered NF instances to the NF instances. NRF 654 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 654 may exhibit the Nnrf service-based interface.

The PCF 656 may provide policy rules to control plane functions to enforce them, and may also support unified policy framework to govern network behavior. The PCF 656 may also implement a front end to access subscription information relevant for policy decisions in a UDR of the UDM 658. In addition to communicating with functions over reference points as shown, the PCF 656 exhibit an Npcf service-based interface.

The UDM 658 may handle subscription-related information to support the network entities' handling of communication sessions, and may store subscription data of UE 602. For example, subscription data may be communicated via an N8 reference point between the UDM 658 and the AMF 644. The UDM 658 may include two parts, an application front end and a UDR. The UDR may store subscription data and policy data for the UDM 658 and the PCF 656, and/or structured data for exposure and application data (including PFDs for application detection, application request information for multiple UEs 602) for the NEF 652. The Nudr service-based interface may be exhibited by the UDR 221 to allow the UDM 658, PCF 656, and NEF 652 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 658 may exhibit the Nudm service-based interface.

The AF 660 may provide application influence on traffic routing, provide access to NEF, and interact with the policy framework for policy control.

In some embodiments, the 5GC 640 may enable edge computing by selecting operator/$3^{rd}$ party services to be geographically close to a point that the UE 602 is attached to the network. This may reduce latency and load on the network. To provide edge-computing implementations, the 5GC 640 may select a UPF 648 close to the UE 602 and execute traffic steering from the UPF 648 to data network 636 via the N6 interface. This may be based on the UE subscription data, UE location, and information provided by the AF 660. In this way, the AF 660 may influence UPF (re)selection and traffic routing. Based on operator deployment, when AF 660 is considered to be a trusted entity, the network operator may permit AF 660 to interact directly with relevant NFs. Additionally, the AF 660 may exhibit an Naf service-based interface.

The data network 636 may represent various network operator services, Internet access, or third party services that may be provided by one or more servers including, for example, application/content server 638.

FIG. 7 schematically illustrates a wireless network 700 in accordance with various embodiments. The wireless network 700 may include a UE 702 in wireless communication with an AN 704. The UE 702 and AN 704 may be similar to, and substantially interchangeable with, like-named components described elsewhere herein.

The UE 702 may be communicatively coupled with the AN 704 via connection 706. The connection 706 is illustrated as an air interface to enable communicative coupling, and can be consistent with cellular communications protocols such as an LTE protocol or a 5G NR protocol operating at mmWave or sub-6 GHz frequencies.

The UE 702 may include a host platform 708 coupled with a modem platform 710. The host platform 708 may include application processing circuitry 712, which may be coupled with protocol processing circuitry 714 of the modem platform 710. The application processing circuitry 712 may run various applications for the UE 702 that source/sink application data. The application processing circuitry 712 may further implement one or more layer operations to transmit/receive application data to/from a data network. These layer operations may include transport (for example UDP) and Internet (for example, IP) operations.

The protocol processing circuitry 714 may implement one or more of layer operations to facilitate transmission or reception of data over the connection 706. The layer operations implemented by the protocol processing circuitry 714 may include, for example, MAC, RLC, PDCP, RRC and NAS operations.

The modem platform 710 may further include digital baseband circuitry 716 that may implement one or more layer operations that are "below" layer operations performed by the protocol processing circuitry 714 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 710 may further include transmit circuitry 718, receive circuitry 720, RF circuitry 722, and RF front end (RFFE) 724, which may include or connect to one or more antenna panels 726. Briefly, the transmit circuitry 718 may include a digital-to-analog converter, mixer, intermediate frequency (IF) components, etc.; the receive circuitry 720 may include an analog-to-digital converter, mixer, IF components, etc.; the RF circuitry 722 may include a low-noise amplifier, a power amplifier, power tracking components, etc.; RFFE 724 may include filters (for example, surface/bulk acoustic wave filters), switches, antenna tuners, beamforming components (for example, phase-array antenna components), etc. The selection and arrangement of the components of the transmit circuitry 718, receive circuitry 720, RF circuitry 722, RFFE 724, and antenna panels 726 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 714 may include one or more instances of control circuitry (not shown) to provide control functions for the transmit/receive components.

A UE reception may be established by and via the antenna panels 726, RFFE 724, RF circuitry 722, receive circuitry 720, digital baseband circuitry 716, and protocol processing circuitry 714. In some embodiments, the antenna panels 726 may receive a transmission from the AN 704 by receive-beamforming signals received by a plurality of antennas/antenna elements of the one or more antenna panels 726.

A UE transmission may be established by and via the protocol processing circuitry 714, digital baseband circuitry 716, transmit circuitry 718, RF circuitry 722, RFFE 724, and antenna panels 726. In some embodiments, the transmit components of the UE 704 may apply a spatial filter to the data to be transmitted to form a transmit beam emitted by the antenna elements of the antenna panels 726.

Similar to the UE 702, the AN 704 may include a host platform 728 coupled with a modem platform 730. The host platform 728 may include application processing circuitry 732 coupled with protocol processing circuitry 734 of the modem platform 730. The modem platform may further include digital baseband circuitry 736, transmit circuitry 738, receive circuitry 740, RF circuitry 742, RFFE circuitry 744, and antenna panels 746. The components of the AN 704 may be similar to and substantially interchangeable with like-named components of the UE 702. In addition to performing data transmission/reception as described above, the components of the AN 708 may perform various logical functions that include, for example, RNC functions such as radio bearer management, uplink and downlink dynamic radio resource management, and data packet scheduling.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840 or other interface circuitry. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processors 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface controllers, components, or other suitable devices to communicate with one or more peripheral devices 804 or one or more databases 806 or other network elements via a network 808. For example, the communication resources 830 may include wired communication components (e.g., for coupling via USB, Ethernet, etc.), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Example Procedures

Figure 9A:
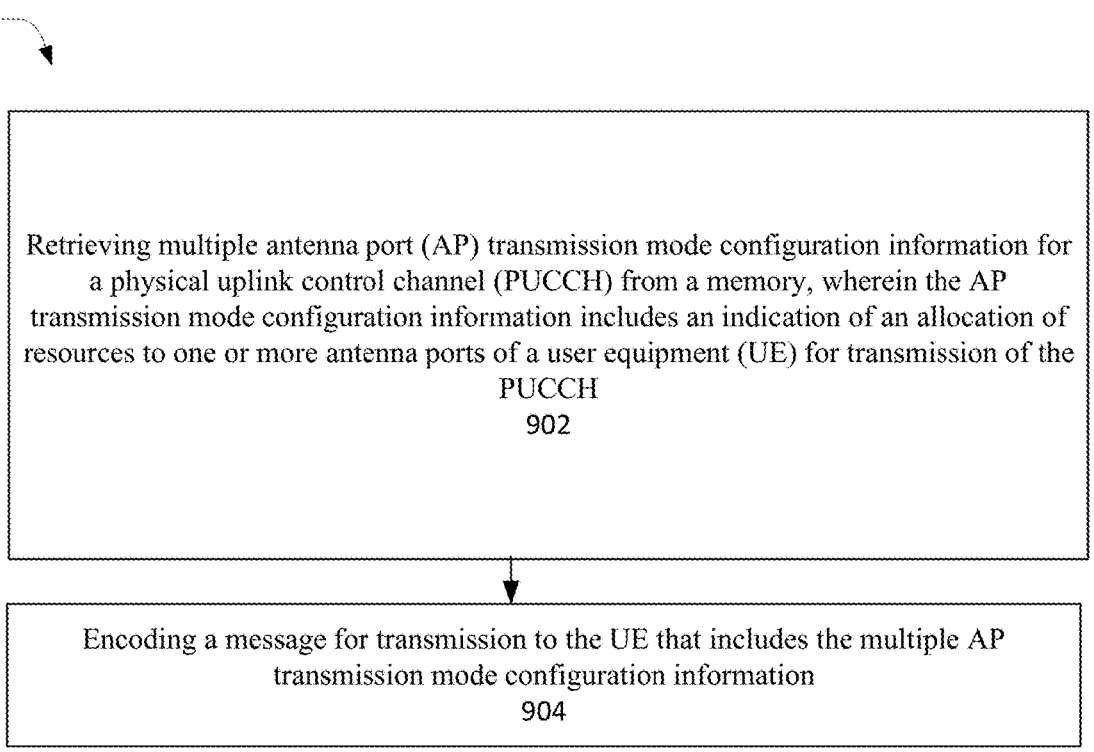
FIGS. 9A, 9B, and 9C illustrate examples processes in accordance with various embodiments.

In some embodiments, the electronic device(s), network (s), system(s), chip(s) or component(s), or portions or implementations thereof, of FIGS. 6-8, or some other figure herein, may be configured to perform one or more processes, techniques, or methods as described herein, or portions thereof. One such process is depicted in FIG. 9A, which may be performed by a next-generation NodeB (gNB) or portion thereof in some embodiments. For example, the process 900 may include, at 902, retrieving multiple antenna port (AP) transmission mode configuration information for a physical uplink control channel (PUCCH) from a memory, wherein the AP transmission mode configuration information includes an indication of an allocation of resources to one or more antenna ports of a user equipment (UE) for transmission of the PUCCH. The process further includes, at 904, encoding a message for transmission to the UE that includes the multiple AP transmission mode configuration information.

Figure 9B:
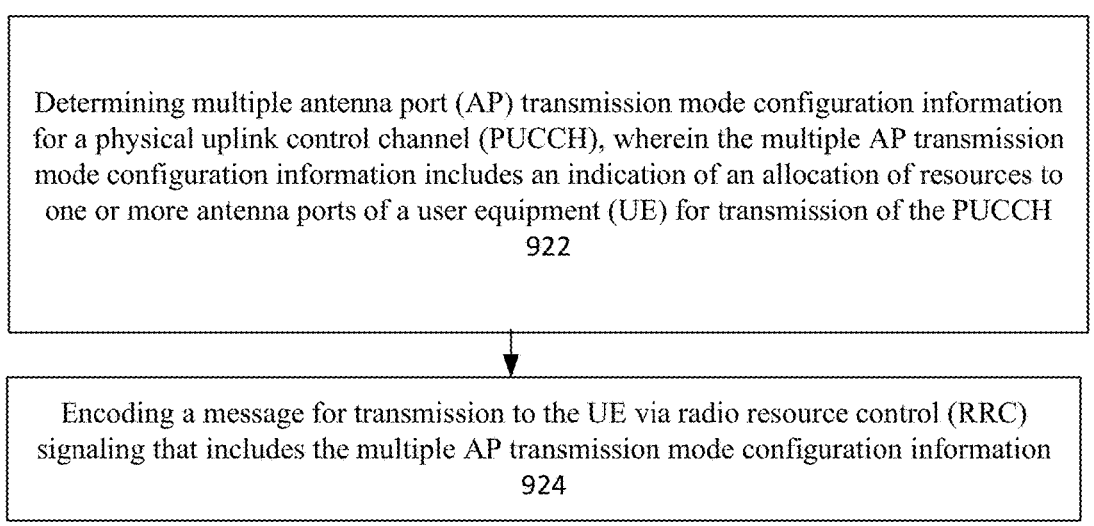

Another such process is illustrated in FIG. 9B, which may be performed by a next-generation NodeB (gNB) or portion thereof in some embodiments. In this example, the process 920 includes, at 922, determining multiple antenna port (AP) transmission mode configuration information for a physical uplink control channel (PUCCH), wherein the multiple AP transmission mode configuration information includes an indication of an allocation of resources to one or more antenna ports of a user equipment (UE) for transmission of the PUCCH. The process further includes, at 924, encoding a message for transmission to the UE via radio resource control (RRC) signaling that includes the multiple AP transmission mode configuration information.

Figure 9C:
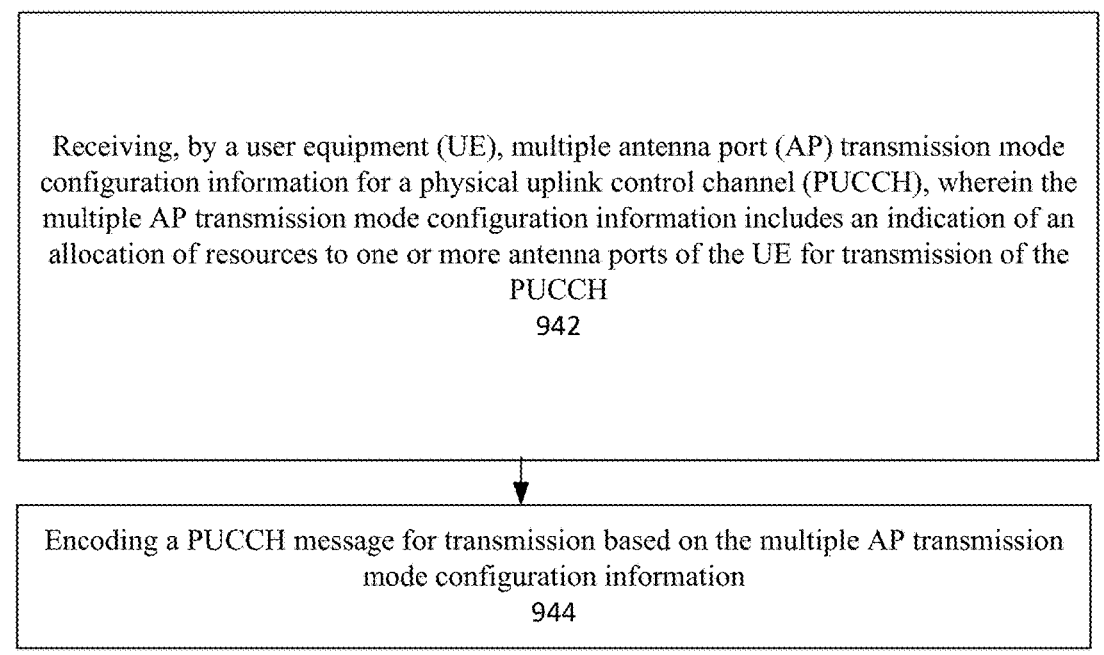

Another such process is illustrated in FIG. 9C, which may be performed by a user equipment (UE) or portion thereof in some embodiments. In this example, the process 940 includes, at 942, receiving multiple antenna port (AP) transmission mode configuration information for a physical uplink control channel (PUCCH), wherein the multiple AP transmission mode configuration information includes an indication of an allocation of resources to one or more antenna ports of the UE for transmission of the PUCCH. The process further includes, at 944, encoding a PUCCH message for transmission based on the multiple AP transmission mode configuration information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of wireless communication for a fifth generation (5G) or new radio (NR) system, the method comprising:

configuring, by a next-generation NodeB (gNB), a multiple antenna port (AP) transmission mode for a physical uplink control channel (PUCCH) via radio resource control (RRC) signaling to a user equipment (UE);

transmitting, by the UE, the PUCCH in accordance with the configured multiple AP transmission mode.

Example 2 may include the method of example 1 or some other example herein, wherein multiple port transmission can be applied for all PUCCH formats, including PUCCH format 0, 1, 2, 3, 4.

Example 3 may include the method of example 1 or some other example herein, wherein different resources in code, frequency and time domain can be allocated in different antenna ports (AP) for the transmission of PUCCHs.

Example 4 may include the method of example 1 or some other example herein, wherein when the number of APs is 2, the distance between starting physical resource block (PRB) of PUCCH transmission in frequency for two APs can be predefined in the specification or configured by higher layers via dedicated radio resource control (RRC) signalling; wherein the distance between starting position of PUCCH transmission in frequency for two APs can be configured per PUCCH format.

Example 5 may include the method of example 1 or some other example herein, wherein the starting PRB for PUCCH transmission for different APs can be determined in accordance with initial or active UL bandwidth part (BWP) BW.

Example 6 may include the method of example 1 or some other example herein, wherein the PUCCH transmission in frequency for two APs follows a mirrored pattern within the initial or active UL BWP.

Example 7 may include the method of example 1 or some other example herein, wherein interleaved PUCCH transmission for different APs can be employed; wherein PUCCH transmission for different APs are mapped to different subcarriers, or physical resource blocks (PRB) in an interleaved manner.

Example 8 may include the method of example 1 or some other example herein, wherein different code domain resources can be configured or allocated for the transmission of PUCCH for different APs.

Example 9 may include the method of example 1 or some other example herein, wherein for PUCCH format 0, different cyclic shift values can be employed for the transmission of PUCCH on different APs.

Example 10 may include the method of example 9 or some other example herein, wherein the cyclic shift offset between the first and second AP can be predefined in the specification or configured by higher layers via minimum system information (MSI), remaining minimum system information (RMSI), other system information (OSI) or dedicated radio resource control (RRC) signaling.

Example 11 may include the method of example 1 or some other example herein, wherein for PUCCH format 1, different cyclic shift values and/or orthogonal cover codes (OCC) can be employed for the transmission of PUCCH on different APs.

Example 12 may include the method of example 1 or some other example herein, wherein different cyclic shifts can be used for different APs for generation of complex value symbols for PUCCH format 1.

Example 13 may include the method of example 1 or some other example herein, wherein different orthogonal sequences can be used for different APs for PUCCH format 1.

Example 14 may include the method of example 1 or some other example herein, wherein different orthogonal cover code (OCC) can be applied for different APs for the transmission of PUCCH format 2.

Example 15 may include the method of example 1 or some other example herein, wherein DMRS for different APs for PUCCH format 2 can be based on different OCCs, which is similar to the UCI transmission.

Example 16 may include the method of example 1 or some other example herein, wherein different pre-DFT orthogonal cover code (OCC) or blocked wise spreading sequences may be assigned in different antenna ports (AP) for the transmission of PUCCH format 3 with interlaced mapping and PUCCH format 4.

Example 17 may include the method of example 1 or some other example herein, wherein OCC index for PUCCH format 1 and 2, blocked wise spreading sequence index for PUCCH format 3 and 4 may be implicitly determined by the AP index for PUCCH transmission.

Example 18 may include the method of example 1 or some other example herein, wherein OCC index for PUCCH format 1 and 2, blocked wise spreading sequence index for PUCCH format 3 and 4 may be implicitly determined by the AP index for PUCCH transmission.

Example 19 may include the method of example 1 or some other example herein, wherein the OCC index and/or blocked wise spreading sequence index for the first AP for the transmission of PUCCH format 1 and 2; PUCCH format 3 and 4 can be configured by higher layers via RRC signaling, wherein OCC index and/or blocked wise spreading sequence index for the subsequently AP can be derived implicitly.

Example 20 may include the method of example 1 or some other example herein, wherein transmit diversity can be applied for the transmission of PUCCH format 2 as a multiple port transmission scheme; wherein space-frequency Alamouti scheme (SFBC) or space-time Alamouti scheme (STBC) can be used for PUCCH format 2 transmission.

Example 21 may include the method of example 1 or some other example herein, wherein if a UE does not have dedicated PUCCH resource configuration, or UE uses PUCCH common resource set for HARQ-ACK feedback, single port transmission is used for PUCCH transmission.

Example 22 may include the method of example 1 or some other example herein, wherein PUCCH with more than one port transmission can be configured by higher layers via dedicated RRC signalling, wherein it can be configured per PUCCH resource or per PUCCH format or per PUCCH resource set.

Example 23 includes a method comprising: determining configuration information regarding a multiple antenna port (AP) transmission mode for physical uplink control channel (PUCCH) transmissions by a user equipment (UE); and encoding the configuration information for transmission to the UE.

Example 24 includes the method of example 23 or some other example herein, wherein the configuration information is to indicate the multiple AP transmission mode is to be applied to PUCCH format 0, 1, 2, 3, or 4.

Example 25 includes the method of example 23 or some other example herein, wherein the configuration information is encoded for transmission via radio resource control (RRC) signaling.

Example 26 includes the method of example 23 or some other example herein, wherein the configuration information is to indicate a PUCCH transmission is to be mapped to different time or frequency resources for each of a plurality of APs.

Example 27 includes the method of example 26 or some other example herein, wherein the configuration information is to indicate a PUCCH transmission is to be mapped to different physical resource blocks (PRBs) for each AP.

Example 28 includes the method of example 23 or some other example herein, wherein the configuration information is to indicate PUCCH transmission resources for different APs are mapped to different subcarriers or PRBs in an interleaved manner.

Example 29 includes the method of example 23 or some other example herein, wherein the configuration information is to indicate different code domain resources are to be allocated for different APs for a PUCCH transmission.

Example 30 includes the method of example 23 or some other example herein, wherein the configuration information is to indicate that different cyclic shift values or different orthogonal cover codes (OCCs) are to be employed for a PUCCH transmission on different APs.

Example 31 includes the method of any of examples 23-30 or some other example herein, wherein the method is performed by a next-generation NodeB (gNB) or portion thereof.

Example 32 includes a method comprising: receiving configuration information regarding a multiple antenna port (AP) transmission mode for physical uplink control channel (PUCCH) transmissions; and encoding a PUCCH message for transmission based on the configuration information.

Example 33 includes the method of example 32 or some other example herein, wherein the configuration information is to indicate the multiple AP transmission mode is to be applied to PUCCH format 0, 1, 2, 3, or 4.

Example 34 includes the method of example 32 or some other example herein, wherein the configuration information is received via radio resource control (RRC) signaling.

Example 34a may include the method of example 34 or some other example herein, wherein the configuration information is to configure a PUCCH transmission with more than one port transmission per PUCCH resource, per PUCCH format, or per PUCCH resource set.

Example 35 includes the method of example 32 or some other example herein, wherein the configuration information is to indicate a PUCCH transmission is to be mapped to different time or frequency resources for each of a plurality of APs.

Example 36 includes the method of example 35 or some other example herein, wherein the configuration information is to indicate a PUCCH transmission is to be mapped to different physical resource blocks (PRBs) for each AP.

Example 37 includes the method of example 32 or some other example herein, wherein the configuration information is to indicate PUCCH transmission resources for different APs are mapped to different subcarriers or PRBs in an interleaved manner.

Example 38 includes the method of example 32 or some other example herein, wherein the configuration information is to indicate different code domain resources are to be allocated for different APs for a PUCCH transmission.

Example 39 includes the method of example 32 or some other example herein, wherein the configuration information is to indicate that different cyclic shift values or different orthogonal cover codes (OCCs) are to be employed for a PUCCH transmission on different APs.

Example 40 includes the method of example 32 or some other example herein, wherein the PUCCH message is encoded for a single-port transmission if a UE performing the transmission does not have a dedicated PUCCH resource configuration, or if the UE uses a PUCCH common resource set for HARQ-ACK feedback.

Example 41 includes the method of any of examples 32-40 or some other example herein, wherein the method is performed by a user equipment (UE) or portion thereof.

Example X1 may include a method of transmitting demodulation reference signal for PUCCH format 3 and 4 when pi/2-BPSK modulation is used.

Example X2 may include the method of example X1 or some other example herein, wherein the sequence length used for transmission of DM-RS is 12 or 24 e.g., 1 or 2PRB PUCCH transmission.

Example X3 may include the methods of examples X1 and X2 or some other example herein, wherein sequence group hopping used for choosing a base sequence from one of a set of 30 base sequences for each sequence length.

Example X4 may include the methods of examples X1-X3 or some other example herein, wherein the sequence group hopping is based on a pseudo-random sequence which is dependent on one or more of the slot index within a radio frame, index of the OFDM symbol within slot, the frequency hopping index if configured.

Example X5 may include the method of example X4 or some other example herein, wherein the PN sequence is a Gold sequence and is initialized with a seed dependent on either the hopping ID (if configured) or the physical or virtual cell ID.

Example X6 may include a method comprising: determining a sequence group hopping for a demodulation reference signal (DMRS) associated with a PUCCH format 3 or 4 that is transmitted using pi/2-BPSK modulation; and communicating or causing communication of the DMRS based on the determined sequence group hopping.

Example X7 may include the method of example X6 or some other example herein, wherein the communicating includes transmitting the DMRS.

Example X8 may include the method of example X6 or some other example herein, wherein the communicating includes receiving the DMRS.

Example X9 may include the method of example X6-X8 or some other example herein, wherein a sequence length of the sequence group hopping is 12 or 24.

Example X10 may include the methods of examples X6-X9 or some other example herein, wherein determining the sequence group hopping includes choosing a base sequence from one of a set of 30 base sequences for each sequence length.

Example X11 may include the methods of examples X6-X10 or some other example herein, wherein the sequence group hopping is based on a pseudo-random sequence which is dependent on one or more of the slot index within a radio frame, index of the OFDM symbol within slot, the frequency hopping index if configured.

Example X12 may include the method of example X11 or some other example herein, wherein the PN sequence is a Gold sequence and is initialized with a seed dependent on either the hopping ID (if configured) or the physical or virtual cell ID.

Example X13 may include the method of example X6-X12 or some other example herein, wherein the method is performed by a UE or a portion thereof.

Example X14 may include the method of example X6-X12 or some other example herein, wherein the method is performed by a gNB or a portion thereof.

Example Y1 includes an apparatus comprising: memory to store multiple antenna port (AP) transmission mode configuration information for a physical uplink control channel (PUCCH); and processor circuitry, coupled with the memory, to: retrieve the multiple AP transmission mode configuration information from the memory, wherein the AP transmission mode configuration information includes an indication of an allocation of resources to one or more antenna ports of a user equipment (UE) for transmission of the PUCCH; and encode a message for transmission to the UE that includes the multiple AP transmission mode configuration information.

Example Y2 includes the apparatus of example Y1 or some other example herein, wherein the message is encoded for transmission to the UE via radio resource control (RRC) signaling.

Example Y3 includes the apparatus of example Y1 or some other example herein, wherein the resources include a code domain resource, a frequency domain resource, or a time domain resource.

Example Y4 includes the apparatus of example Y1 or some other example herein, wherein the PUCCH is PUCCH format 0, 1, 2, 3, or 4.

Example Y5 includes the apparatus of example Y4 or some other example herein, wherein the AP transmission mode configuration information includes an indication of sequence group hopping to be used for PUCCH format 3 or 4, wherein the sequence group hopping is dependent on a slot index or an orthogonal frequency division multiplexing (OFDM) symbol index within a slot.

Example Y6 includes the apparatus of example Y1 or some other example herein, wherein the multiple AP transmission mode configuration information is to indicate a PUCCH transmission is to be mapped to different physical resource blocks (PRBs) for each AP.

Example Y7 includes the apparatus of example Y1 or some other example herein, wherein the multiple AP transmission mode configuration information is to indicate PUCCH transmission resources for different APs are mapped to different subcarriers or PRBs in an interleaved manner.

Example Y8 includes the apparatus of example Y1 or some other example herein, wherein the multiple AP transmission mode configuration information is to indicate different code domain resources are to be allocated for different APs for a PUCCH transmission.

Example Y9 includes the apparatus of example Y1 or some other example herein, wherein the multiple AP transmission mode configuration information is to indicate that different cyclic shift values or different orthogonal cover codes (OCCs) are to be employed for a PUCCH transmission on different APs.

Example Y10 includes one or more non-transitory computer-readable media storing instructions that, when executed by one or more processors, are to cause a next-generation NodeB (gNB) to: determine multiple antenna port (AP) transmission mode configuration information for a physical uplink control channel (PUCCH), wherein the multiple AP transmission mode configuration information includes an indication of an allocation of resources to one or more antenna ports of a user equipment (UE) for transmission of the PUCCH; and encode a message for transmission to the UE via radio resource control (RRC) signaling that includes the multiple AP transmission mode configuration information.

Example Y11 includes the one or more non-transitory computer-readable media of example Y10 or some other example herein, wherein the resources include a code domain resource, a frequency domain resource, or a time domain resource.

Example Y12 includes the one or more non-transitory computer-readable media of example Y10 or some other example herein, wherein the PUCCH is PUCCH format 0, 1, 2, 3, or 4.

Example Y13 includes the one or more non-transitory computer-readable media of example Y12 or some other example herein, wherein the AP transmission mode configuration information includes an indication of sequence group hopping to be used for PUCCH format 3 or 4, wherein the sequence group hopping is dependent on a slot index or an orthogonal frequency division multiplexing (OFDM) symbol index within a slot.

Example Y14 includes the one or more non-transitory computer-readable media of example Y10 or some other example herein, wherein the multiple AP transmission mode configuration information is to indicate: a PUCCH transmission is to be mapped to different physical resource blocks (PRBs) for each AP; PUCCH transmission resources for different APs are mapped to different subcarriers or PRBs in an interleaved manner; or different code domain resources are to be allocated for different APs for a PUCCH transmission.

Example Y15 includes the one or more non-transitory computer-readable media of example Y10 or some other example herein, wherein the multiple AP transmission mode configuration information is to indicate that different cyclic shift values or different orthogonal cover codes (OCCs) are to be employed for a PUCCH transmission on different APs.

Example Y16 includes one or more non-transitory computer-readable media storing instructions that, when executed by one or more processors, are to cause a user equipment (UE) to: receive multiple antenna port (AP) transmission mode configuration information for a physical uplink control channel (PUCCH), wherein the multiple AP transmission mode configuration information includes an indication of an allocation of resources to one or more antenna ports of the UE for transmission of the PUCCH; and encode a PUCCH message for transmission based on the multiple AP transmission mode configuration information.

Example Y17 includes the one or more non-transitory computer-readable media of example Y16 or some other example herein, wherein the message is received via radio resource control (RRC) signaling.

Example Y18 includes the one or more non-transitory computer-readable media of example Y16 or some other example herein, wherein the resources include a code domain resource, a frequency domain resource, or a time domain resource.

Example Y19 includes the one or more non-transitory computer-readable media of example Y16 or some other example herein, wherein the PUCCH is PUCCH format 0, 1, 2, 3, or 4.

Example Y20 includes the one or more non-transitory computer-readable media of example Y19 or some other example herein, wherein the AP transmission mode configuration information includes an indication of sequence group hopping to be used for PUCCH format 3 or 4, wherein the sequence group hopping is dependent on a slot index or an orthogonal frequency division multiplexing (OFDM) symbol index within a slot.

Example Y21 includes the one or more non-transitory computer-readable media of example Y16 or some other example herein, wherein the multiple AP transmission mode configuration information is to indicate a PUCCH transmission is to be mapped to different physical resource blocks (PRBs) for each AP.

Example Y22 includes the one or more non-transitory computer-readable media of example Y16 or some other example herein, wherein the multiple AP transmission mode configuration information is to indicate: PUCCH transmission resources for different APs are mapped to different subcarriers or PRBs in an interleaved manner; different code domain resources are to be allocated for different APs for a PUCCH transmission; or different cyclic shift values or different orthogonal cover codes (OCCs) are to be employed for a PUCCH transmission on different APs.

Example Z01 may include an apparatus comprising means to perform one or more elements of a method described in or related to any of examples 1-Y16, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-Y16, or any other method or process described herein.

Example Z03 may include an apparatus comprising logic, modules, or circuitry to perform one or more elements of a method described in or related to any of examples 1-Y16, or any other method or process described herein.

Example Z04 may include a method, technique, or process as described in or related to any of examples 1-Y16, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-Y16, or portions thereof.

Example Z06 may include a signal as described in or related to any of examples 1-Y16, or portions or parts thereof.

Example Z07 may include a datagram, packet, frame, segment, protocol data unit (PDU), or message as described in or related to any of examples 1-Y16, or portions or parts thereof, or otherwise described in the present disclosure.

Example Z08 may include a signal encoded with data as described in or related to any of examples 1-Y16, or portions or parts thereof, or otherwise described in the present disclosure.

Example Z09 may include a signal encoded with a datagram, packet, frame, segment, protocol data unit (PDU), or message as described in or related to any of examples 1-Y16, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-Y16, or portions thereof.

Example Z11 may include a computer program comprising instructions, wherein execution of the program by a processing element is to cause the processing element to carry out the method, techniques, or process as described in or related to any of examples 1-Y16, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, |
| CSI-RS | Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |

-continued

| | |
|---|---|
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN, |
| GSM EDGE | Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |

-continued

| | |
|---|---|
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking |
| WLAN | Constraint length of the convolutional code, |
| USIM | Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier ksps kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |

-continued

| | |
|---|---|
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution M2M Machine-to-Machine |
| MAC | Medium Access Control (protocol layering context) |
| MAC | Message authentication code (security/encryption context) |
| MAC-A | MAC used for authentication and key agreement (TSG TWG3 context) |
| MAC-IMAC | used for data integrity of signalling messages (TSGT WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MnS | Management Service |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN |
| E-UTRA-NR | Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |

-continued

| | |
|---|---|
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDM | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSFCH | Physical Sidelink Feedback Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |

-continued

| | |
|---|---|
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |

-continued

| | |
|---|---|
| SEPP | Security Edge Protection Proxy |
| SFI | Slot format indication |
| SFTD | Space-Frequency Time Diversity, SFN and frame timing difference |
| SFN | System Frame Number or Single Frequency Network |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | SS Block |
| SSBRI | SSB Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDR | Unified Data Repository |
| UDSF | Unstructured Data Storage Network Function |
| UICC | Universal Integrated Circuit Card |

| | |
|---|---|
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:
  memory to store multiple antenna port (AP) transmission mode configuration information for a physical uplink control channel (PUCCH); and
  processor circuitry, coupled with the memory, to:
    retrieve the multiple AP transmission mode configuration information from the memory, wherein the AP transmission mode configuration information includes an indication of an allocation of resources to two or more APs of a user equipment (UE) for transmission of the PUCCH; and encode a message for transmission to the UE that includes the multiple AP transmission mode configuration information;
wherein the multiple AP transmission mode configuration information is to cause the UE to:
transmit the PUCCH by a first AP of the two or more APs in a set of time domain resources of a slot and at a first frequency domain resource with a first starting physical resource block (PRB) index;
transmit the PUCCH by a second AP of the two or more APs in the set of time domain resources of the slot and at a second frequency domain resource with a second starting PRB index; and
wherein a frequency distance between the first starting PRB index and the second starting PRB index is half of an initial or active bandwidth part (BWP) bandwidth related to the PUCCH transmission.

2. The apparatus of claim 1, wherein the message is encoded for transmission to the UE via radio resource control (RRC) signaling.

3. The apparatus of claim 1, wherein the resources include a code domain resource, the first or second frequency domain resource, or a time domain resource of the set of time domain resources.

4. The apparatus of claim 1, wherein the PUCCH is PUCCH format 0, 2, or 4.

5. The apparatus of claim 4, wherein the AP transmission mode configuration information includes an indication of sequence group hopping to be used for PUCCH format 4, wherein the sequence group hopping is dependent on a slot index or an orthogonal frequency division multiplexing (OFDM) symbol index within a slot.

6. The apparatus of claim 1, wherein the multiple AP transmission mode configuration information is to indicate different code domain resources are to be allocated for the first and second APs for the PUCCH transmissions.

7. The apparatus of claim 1, wherein the multiple AP transmission mode configuration information is to indicate that different cyclic shift values or different orthogonal cover codes (OCCs) are to be employed for PUCCH transmissions on the first and second APs.

8. One or more non-transitory computer-readable media storing instructions that, when executed by one or more processors, are to cause a next-generation NodeB (gNB) to:
determine multiple antenna port (AP) transmission mode configuration information for a physical uplink control channel (PUCCH), wherein the multiple AP transmission mode configuration information includes an indication of an allocation of resources to two or more antenna ports (APs) of a user equipment (UE) for transmission of the PUCCH; and
encode a message for transmission to the UE via radio resource control (RRC) signaling that includes the multiple AP transmission mode configuration information;
wherein the multiple AP transmission mode configuration information is to cause the UE to:
transmit, from a first AP of the two or more APs, the PUCCH on a set of time domain resources and a first frequency domain resource;
transmit, from the first AP, the PUCCH on the set of time domain resources and a second frequency domain resource; and
transmit, from a second AP of the two or more APs, the PUCCH on the set of time domain resources and at a third frequency domain resource that is between the first and second frequency domain resources in the frequency domain.

9. The one or more non-transitory computer-readable media of claim 8, wherein the resources include a code domain resource, the first, second, and third frequency domain resources, or a time domain resource of the set of time domain resources.

10. The one or more non-transitory computer-readable media of claim 8, wherein the PUCCH is PUCCH format 0, 1, 2, 3, or 4.

11. The one or more non-transitory computer-readable media of claim 10, wherein the AP transmission mode configuration information includes an indication of sequence group hopping to be used for PUCCH format 3 or 4, wherein the sequence group hopping is dependent on a slot index or an orthogonal frequency division multiplexing (OFDM) symbol index within a slot.

12. The one or more non-transitory computer-readable media of claim 8, wherein the multiple AP transmission mode configuration information is to further indicate:
different code domain resources are to be allocated for different APs for a PUCCH transmission.

13. The one or more non-transitory computer-readable media of claim 8, wherein the multiple AP transmission mode configuration information is to indicate that different cyclic shift values or different orthogonal cover codes (OCCs) are to be employed for a PUCCH transmission on different APs.

14. One or more non-transitory computer-readable media storing instructions that, when executed by one or more processors, are to cause a user equipment (UE) to:
identify, received from a base station, multiple antenna port (AP) transmission mode configuration information for a physical uplink control channel (PUCCH), wherein the multiple AP transmission mode configuration information includes an indication of an allocation of resources to two or more antenna ports (APs) of the UE for transmission of the PUCCH;
transmit the PUCCH by a first AP of the two or more APs in a set of time domain resources of a slot and at a first frequency domain resource with a first starting physical resource block (PRB) index;
transmit the PUCCH by a second AP of the two or more APs in the set of time domain resources of the slot and at a second frequency domain resource with a second starting PRB index; and
wherein a frequency distance between the first starting PRB index and the second starting PRB index is half of an initial or active bandwidth part (BWP) bandwidth related to the PUCCH transmission.

15. The one or more non-transitory computer-readable media of claim 14, wherein the message is received via radio resource control (RRC) signaling.

16. The one or more non-transitory computer-readable media of claim 14, wherein the resources include a code domain resource, the first or second frequency domain resource, or a time domain resource of the set of time domain resources.

17. The one or more non-transitory computer-readable media of claim 14, wherein the PUCCH is PUCCH format 0, 1, 2, 3, or 4.

18. The one or more non-transitory computer-readable media of claim 17, wherein the AP transmission mode configuration information includes an indication of sequence group hopping to be used for PUCCH format 3 or 4, wherein the sequence group hopping is dependent on a slot index or an orthogonal frequency division multiplexing (OFDM) symbol index within a slot.

19. The one or more non-transitory computer-readable media of claim 14, wherein the multiple AP transmission mode configuration information is to indicate:
different code domain resources are to be allocated for different APs for a PUCCH transmission; or
different cyclic shift values or different orthogonal cover codes (OCCs) are to be employed for a PUCCH transmission on different APs.

* * * * *